(12) United States Patent
Yoshio et al.

(10) Patent No.: US 7,346,270 B2
(45) Date of Patent: *Mar. 18, 2008

(54) INFORMATION RECORD MEDIUM, APPARATUS FOR RECORDING THE SAME AND APPARATUS FOR REPRODUCING THE SAME

(75) Inventors: Junichi Yoshio, Tokorozawa (JP); Ryuichiro Yoshimura, Tokorozawa (JP); Takao Sawabe, Tokyo-to (JP); Yoshiaki Moriyama, Tsurugashima (JP); Kaoru Yamamoto, Tsurugashima (JP); Akihiro Tozaki, Tsurugashima (JP)

(73) Assignee: Pioneer Electronic Corporation, Tokyo-to (JP)

( * ) Notice: Subject to any disclaimer, the term of this patent is extended or adjusted under 35 U.S.C. 154(b) by 975 days.

This patent is subject to a terminal disclaimer.

(21) Appl. No.: 10/427,970

(22) Filed: May 2, 2003

(65) Prior Publication Data

US 2003/0206712 A1  Nov. 6, 2003

Related U.S. Application Data

(63) Continuation of application No. 09/862,457, filed on May 23, 2001, now Pat. No. 6,567,612, which is a continuation of application No. 09/440,290, filed on Nov. 15, 1999, now Pat. No. 6,266,478, which is a continuation of application No. 08/831,716, filed on Apr. 1, 1997, now Pat. No. 6,088,506.

(30) Foreign Application Priority Data

Apr. 5, 1996 (JP) ............................ P08-83478

(51) Int. Cl.
  *H04N 5/00*   (2006.01)
  *H04N 7/26*   (2006.01)
  *H04N 7/00*   (2006.01)

(52) U.S. Cl. ................. 386/125; 386/124; 386/46
(58) Field of Classification Search ................ 386/125, 386/124, 45, 46, 1, 40, 52, 4
See application file for complete search history.

(56) References Cited

U.S. PATENT DOCUMENTS 5,703,997 A    12/1997   Kitamura et al. ............. 386/97

(Continued)

FOREIGN PATENT DOCUMENTS

EP          0 325 325 A2    7/1989

(Continued)

*Primary Examiner*—Robert Chevalier
(74) *Attorney, Agent, or Firm*—Drinker Biddle & Reath LLP

(57) ABSTRACT

An information reproducing apparatus has a read device, is capable of reproducing sub picture information and is also capable of performing a highlight display of the sub picture information. In an information record medium to be reproduced by this reproducing apparatus, at least the sub picture information and reproduction control information to control a reproduction of the sub picture information are recorded on the record track such that the sub picture information and the reproduction control information are divided into a plurality of groups. Each of the groups is a predetermined unit able to be accessed by the information reproducing apparatus, and has a sub picture pack in which the sub picture information is contained and a control pack in which the reproduction control information is contained. The reproduction control information includes (i) highlight display control information prescribing at least one of the highlight display of the sub picture information and an operation control corresponding to the sub picture information and (ii) time management information indicating times to manage a start time and an end time respectively of at least one of an effective time period during which the highlight display is effective and an effective time period during which the operation control is effective.

34 Claims, 11 Drawing Sheets

U.S. PATENT DOCUMENTS

| | | | |
|---|---|---|---|
| 5,758,007 A | 5/1998 | Kitamura et al. | 386/45 |
| 5,963,704 A | 10/1999 | Mimura et al. | 386/95 |
| 6,088,506 A * | 7/2000 | Yoshio et al. | 386/46 |
| 6,118,927 A | 9/2000 | Kikuchi et al. | 386/95 |
| 6,266,478 B1 * | 7/2001 | Yoshio et al. | 386/46 |
| 6,567,612 B2 * | 5/2003 | Yoshio et al. | 386/125 |

FOREIGN PATENT DOCUMENTS

| | | |
|---|---|---|
| EP | 0 521 487 A1 | 1/1993 |
| EP | 0 607 904 A2 | 7/1994 |
| EP | 0 676 758 A1 | 10/1995 |
| EP | 0 677 843 A1 | 10/1995 |
| EP | 0 677 961 A2 | 10/1995 |
| EP | 0 738 078 A2 | 10/1996 |
| EP | 0 788 094 A1 | 8/1997 |
| JP | 08-339663 | 12/1996 |
| WO | 97/37491 | 10/1997 |

* cited by examiner

STRUCTURE OF INTERLEAVED UNIT

IU : INTERLEAVED UNIT

FIG. 5

DATA STRUCTURE OF HIGHLIGHT GENERAL INFORMATION (HL_GI)

| INFORMATION CONTENT (DATA NAME) | BYTE NUMBER |
|---|---|
| 201 — HIGHLIGHT STATUS (HLI_SS) | 2 |
| 202 — HIGHLIGHT START POINTS (HLI_SPTS) | 4 |
| 203 — HIGHLIGHT END POINTS (HLI_EPTS) | 1 |
| BUTTON MODE (BTN_MD) | 1 |
| BUTTON START NO. (BTN_SN) | 1 |
| NUMBER OF BUTTONS (BTN_NS) | 1 |
| NUMBER OF NUMERICAL SELECTION BUTTONS (NSBTN_NS) | 1 |
| FORCEDLY SELECTED BUTTON NO. (FSLBTN_N) | 1 |
| FORCEDLY ACTUATED BUTTON NO. (FACBTN_N) | 1 |
| (TOTAL) | 16 |

DATA STRUCTURE OF 2 BYTES INFORMATION
INDICATING HIGHLIGHT STATUS

FIG. 7

DATA STRUCTURE OF 4 BYTES INFORMATION
INDICATING HIGHLIGHT START POINTS

202

| b31 | b30 | b29 | b28 | b27 | b26 | b25 | b24 |
|---|---|---|---|---|---|---|---|
| HLI_SPTS [31···24BIT] | | | | | | | |

| b23 | b22 | b21 | b20 | b19 | b18 | b17 | b16 |
|---|---|---|---|---|---|---|---|
| HLI_SPTS [23···16BIT] | | | | | | | |

| b15 | b14 | b13 | b12 | b11 | b10 | b9 | b8 |
|---|---|---|---|---|---|---|---|
| HLI_SPTS [15···8BIT] | | | | | | | |

| b7 | b6 | b5 | b4 | b3 | b2 | b1 | b0 |
|---|---|---|---|---|---|---|---|
| HLI_SPTS [7···0BIT] | | | | | | | |

HLI_SPTS [31···0BIT]
=HIGHLIGHT START TIME (sec) × 90000 (Hz)

DATA STRUCTURE OF 4 BYTES INFORMATION
INDICATING HIGHLIGHT END POINTS

203

| b31 | b30 | b29 | b28 | b27 | b26 | b25 | b24 |
|---|---|---|---|---|---|---|---|
| HLI_EPTS [31···24BIT] ||||||||

| b23 | b22 | b21 | b20 | b19 | b18 | b17 | b16 |
|---|---|---|---|---|---|---|---|
| HLI_EPTS [23···16BIT] ||||||||

| b15 | b14 | b13 | b12 | b11 | b10 | b9 | b8 |
|---|---|---|---|---|---|---|---|
| HLI_EPTS [15···8BIT] ||||||||

| b7 | b6 | b5 | b4 | b3 | b2 | b1 | b0 |
|---|---|---|---|---|---|---|---|
| HLI_EPTS [7···0BIT] ||||||||

HLI_EPTS [31···0BIT]
= HIGHLIGHT END TIME (sec) × 90000 (Hz)

INFORMATION RECORD MEDIUM, APPARATUS FOR RECORDING THE SAME AND APPARATUS FOR REPRODUCING THE SAME This is a continuation of application Ser. No. 09/862,457, filed on May 23, 2001 now U.S. Pat. No. 6,567,612, which is a continuation of application Ser. No. 09/440,290, filed on Nov. 15, 1999, now U.S. Pat. No. 6,266,478, which is a continuation of application Ser. No. 08/831,716, filed on Apr. 1, 1997, now U.S. Pat. No. 6,088,506.

BACKGROUND OF THE INVENTION

1. Field of the Invention

The present invention relates to an information record medium such as an optical disk of a high recording density type, which is capable of recording information such as video information, audio information and the like at a high density, and which is represented by a DVD (Digital Video or Versatile Disk). The present invention also relates to a recording apparatus for recording the information onto the information record medium, and a reproducing apparatus for reproducing the information from the information record medium.

2. Description of the Related Art

Conventionally, a so-called LD (Laser Disk) and a so-called CD (Compact Disk) are generalized as optical disks, on which information such as video information, audio information and the like is recorded.

On the LD, the CD or the like, the video information and the audio information are recorded together with time information indicating a time at which each information is to be reproduced with respect to a reproduction start position, which each LD or the like has, as a standard position. Thus, other than a general normal reproduction to reproduce the recorded information in the order of recording, various special reproductions are possible, such as a reproduction to extract and listen to an only desirable music out of a plurality of recorded musics, a reproduction to listen to the recorded musics in a random order and so on, in case of the CD, for example.

However, there is a problem that, according to the above mentioned CD, LD or the like, a so-called interactive and variegated reproduction is not possible in which the audience can have a plurality of selection branches as for the video or audio information to be displayed or sound-outputted and in which the audience can select them to watch or listen to it. Especially, it is not possible to perform such a complicated reproduction that the audience can select a desirable menu on a so-called GUI (Graphical User Interface) picture plane, in which a sub picture of a transparent user menu etc. is superimposed and displayed on a main picture.

On the other hand, various proposals and developments are being made as for the DVD, as an optical disk in which the memory capacity is improved by about ten times without changing the size of the optical disk itself as compared with the aforementioned conventional CD. According to the knowledge of the present inventors, it is anticipated that it is possible, as for the DVD having such a large memory capacity, to record the sub picture information in addition to the audio information and the video information, and constitute the aforementioned GUI picture plane which is obtained by reproducing the main and sub pictures; and further highlight-display one portion of the sub picture (e.g., display to emphasize one portion by changing the brightness and/or the chroma). Here, it is anticipated that a highlight-display of merely superimposing a static sub picture on a main picture can be realized rather easily by employing the conventional technique of superimposing the subtitles on a movie. On the other hand, in this kind of DVD of a large memory capacity type, it is anticipated that the aforementioned interactive reproduction can be performed.

However, if the highlight-displayed portion of the sub picture is tried to be moved at a high speed, it is anticipated that the time control with respect to the highlight-displayed portion of the sub picture, which is reproduced on the basis of a plurality of informations such as the main picture information (i.e. the video information), the sub picture information, the control information and soon, would be complicated and difficult. In addition, in order to perform the interactive reproduction on the display picture plane at the same function level as that of the personal computer, it is anticipated that the precise time management will be necessary for the highlight-displayed portion of the sub picture.

Further, in the technical art of the DVD, the actuality is such that a person having an ordinary skill in this art does not even recognize the subject itself to move the highlight-displayed portion of the sub picture at a high speed or to realize the interactive reproduction on the display picture plane at the same function level as that of the personal computer.

SUMMARY OF THE INVENTION

It is therefore an object of the present invention to provide an information record medium, which enables a precise setting of an effective time period of the highlight display or the operation control of the sub picture, and also provide an apparatus for recording the same, and an apparatus for reproducing the same.

The above object of the present invention can be achieved by an information record medium having a record track to be reproduced by an information reproducing apparatus. The information reproducing apparatus is provided with a read device, is capable of reproducing sub picture information while relatively moving the read device along the record track recorded with at least the sub picture information and is also capable of performing a highlight display of the sub picture information. In the information record medium of the present invention, at least the sub picture information and reproduction control information to control a reproduction of the sub picture information by the information reproducing apparatus are recorded on the record track such that the sub picture information and the reproduction control information are divided into a plurality of groups, each of which is a predetermined unit able to be accessed by the information reproducing apparatus and each of which comprises a sub picture pack in which the sub picture information is contained and a control pack in which the reproduction control information is contained. The reproduction control information comprises (i) highlight display control information prescribing at least one of the highlight display of the sub picture information and an operation control corresponding to the sub picture information and (ii) time management information indicating times to manage a start time and an end time respectively of at least one of an effective time period during which the highlight display is effective and an effective time period during which the operation control is effective by a predetermined unit finer than the predetermined unit of the data group.

According to the information record medium of the present invention, at least the sub picture information and the reproduction control information are recorded on the record track such that they are divided into a plurality of groups, each of which is a predetermined unit able to be accessed by the information reproducing apparatus. Each of the groups comprises the sub picture pack, in which the sub picture information is contained, and the control pack, in which the reproduction control information is contained. Here, the reproduction control information comprises (i) the highlight display control information prescribing at least one of the highlight display of the sub picture information and the operation control corresponding to the sub picture information and (ii) the time management information indicating times to manage the start time and the end time of at least one of the effective time periods of the highlight display and the operation control, by a predetermined unit finer than the predetermined unit of the data group. Thus, at the time of reproduction, it is possible to perform the highlight display and the operation control of the sub picture in accordance with the highlight display control information as the occasion demand. And that, at the time of this performance, the start and end of the effective time period of the highlight display and the operation control can be set precisely as for the time in accordance with the time management information, especially.

Accordingly, it is possible to perform the highlight display and the operation control of the sub picture precisely as for the time, by use of a rather simple hardware construction and algorithm.

In one aspect of the information record medium of the present invention, respective one reproduction control information belonging to one data group comprises highlight identical information indicating whether the highlight display and the operation control, which are same as those indicated by another reproduction control information belonging to another data group located at a position on the record track to be logically reproduced in previous to the one data group by one unit of the data group, are to be performed or not.

According to this aspect, the reproduction control information comprises the highlight identical information which indicates whether the highlight display and the operation control which are the same as those indicated by the previous reproduction control information are to be performed or not. Thus, at the time of reproduction, by continuing the highlight display and the operation control as they are if it is enough to continue the immediately previous highlight display and operation control according to the pertinent highlight identical information, it is possible to perform the highlight display and the operation control of the sub picture precisely as for the time without performing the superfluous data process with respect to the newly reproduced reproduction control information.

In another aspect of the information record medium of the present invention, respective one reproduction control information belonging to one data group comprises highlight partially identical information indicating whether the highlight display and the operation control, which specific portion is same as that indicated by another reproduction control information belonging to another data group located at a position on the record track to be logically reproduced in previous to the one data group by one unit of the data group, are to be performed or not.

According to this aspect, the reproduction control information comprises the highlight partially identical information which indicates whether the highlight display and the operation control which specific portion is the same as that indicated by the previous reproduction control information are to be performed or not. Thus, at the time of reproduction, by performing the data process only with respect to the portion other than the identical specific portion of the reproduced information so as to continue the immediately previous highlight display and operation control or add some modification to the immediately previous highlight display and operation control according to the pertinent highlight partially identical information, it is possible to perform the highlight display and the operation control of the sub picture precisely as for the time without performing the superfluous data process or updating process with respect to the partially identical portion of the newly reproduced reproduction control information.

Accordingly, the highlight display and the operation control of the sub picture can be performed precisely as for the time by use of the rather simple hardware construction and algorithm.

As another aspect of the information record medium of-the present invention, the information reproducing apparatus reproduces at least one of main picture information and audio information together with the sub picture information while relatively moving the read device along the record track on which the at least one of main picture information and audio information is further recorded. The at least one of main picture information and audio information is recorded such that the at least one of main picture information and audio information is divided into the plurality of data groups, each of which comprises (i) at least one of a main picture pack in which the main picture information is contained, an audio pack in which the audio information is contained and the sub picture pack and (ii) the control pack. And that, the main picture pack, sub picture pack and audio pack are time-axis-multiplexed and arranged along the record track within the data group or over the plurality of data groups.

According to this aspect, a plurality of data groups has the main picture pack and/or the audio pack in addition to the sub picture pack and the control pack. Here, these main picture pack, sub picture pack and audio pack are time-axis-multiplexed and arranged along the record track within one group or over a plurality of groups. Thus, at the time of reproduction, the main picture information, the sub picture information and the audio information can be reproduced together in correspondence to each other as for the time.

Accordingly, it is possible to perform the reproduction outputs of the main picture information and the audio information and to perform the highlight display and the operation control of the sub picture, precisely as for the time, by use of a rather simple hardware construction and algorithm.

An information record medium according to claim 4, wherein the sub picture information is to be superimposed on the main picture information, to thereby be reproduced.

According to this aspect, at the time of reproduction, the highlight display and the operation control of the sub picture, which is superimposed on the main picture, can be performed precisely as for the time, by use of a rather simple hardware construction and algorithm.

The above object of the present invention can be also achieved by an information recording apparatus for recording information onto an information record medium having a record track to be reproduced by an information reproducing apparatus. The information reproducing apparatus has a read device, is capable of reproducing sub picture information while relatively moving the read device along the record track recorded with at least the sub picture information and is also capable of performing a highlight display of the sub picture information. The information recording apparatus is provided with: a record device for recording onto the record track at least the sub picture information and reproduction control information to control a reproduction of the sub picture information by the information reproducing apparatus such that the sub picture information and the reproduction control information are divided into a plurality of groups, each of which is a predetermined unit able to be accessed by the information reproducing apparatus and each of which comprises a sub picture pack in which the sub picture information is contained and a control pack in which the reproduction control information is contained, the reproduction control information comprising (i) highlight display control information prescribing at least one of the highlight display of the sub picture information and an operation control corresponding to the sub picture information and (ii) time management information indicating times to manage a start time and an end time respectively of at least one of an effective time period during which the highlight display is effective and an effective time period during which the operation control is effective by a predetermined unit finer than the predetermined unit of the data group; and an input device for inputting at least the highlight display control information and the time management information among the reproduction control information.

According to the information recording apparatus of the present invention, at first, by the record device, the sub picture information is recorded into each of the sub picture packs included in each of the groups on the record track. Further, when at least the aforementioned highlight display control information and the time management information among the reproduction control information are inputted by the input device, this reproduction control information is recorded by the record device into each of the control packs. Thus, the above described information record medium of the present invention can be recorded and obtained.

In one aspect of the information recording apparatus of the present invention, the information reproducing apparatus reproduces at least one of main picture information and audio information together with the sub picture information while relatively moving the read device along the record track on which the at least one of main picture information and audio information is further recorded. The record device records onto the record track the at least one of main picture information and audio information such that the at least one of main picture information and audio information is divided into the plurality of data groups, each of which comprises (i) at least one of a main picture pack in which the main picture information is contained, an audio pack in which the audio information is contained and the sub picture pack and (ii) the control pack. And that, the record device comprises a multiplex device for time-axis-multiplexing and arranging the main picture pack, sub picture pack and audio pack along the record track within the data group or over the plurality of data groups.

According to this aspect, since the main picture pack, the sub picture pack, the audio pack etc. are time-axis-multiplexed along the record track within one data group or over a plurality of data groups, the aforementioned aspect of the information record medium of the present invention an be recorded and obtained.

The above object of the present invention can be also achieved by an information reproducing apparatus for reproducing the above described information record medium of the present invention. The information reproducing apparatus is provided with: a read device for reading information recorded at a predetermined reading position on the record track; an extract device for extracting the sub picture pack and the control pack independently from the information read by the read device; a control information decode device for decoding the reproduction control information included in the extracted control pack; a sub picture decode device for decoding the sub picture information included in the extracted sub picture pack; and a control device for controlling the sub picture decode device to perform the highlight display and the operation control of the sub picture information in accordance with the highlight display control information and the time management information included in the decoded reproduction control information.

According to the information reproducing apparatus of the present invention, the information recorded at the predetermined reading position on the record track is read by the read device. Then, the sub picture pack and the control pack are extracted by the extract device independently from this read information. Then, the reproduction control information included in the extracted control pack is decoded by the control information decode device while the sub picture information included in the extracted sub picture pack is decoded by the sub picture decode device. At this time, under the control of the control device, the highlight display and the operation control of the sub picture information is performed by the sub picture decode device, in accordance with the highlight display control information and the time management information included in the decoded reproduction control information. Thus, the highlight display and the operation control of the sub picture can be performed precisely as for the time, by use of a rather simple hardware construction and algorithm. As a result, an information reproducing apparatus for the DVD, which is capable of performing the interactive reproduction while performing the highlight display and the button operations or the like at precise timings, can be realized.

In one aspect of the information reproducing apparatus of the present invention, in the information record medium, at least one of main picture information and audio information is recorded on the record track such that the at least one of main picture information and audio information is divided into the plurality of data groups, each of which comprises (i) at least one of a main picture pack in which the main picture information is contained, an audio pack in which the audio information is contained and the sub picture pack and (ii) the control pack; and the main picture pack, sub picture pack and audio pack are time-axis-multiplexed and arranged along the record track within the data group or over the plurality of data groups. The extract device extracts the at least one of main picture pack and audio pack independently from the information read by the read device. And that, the information reproducing apparatus further comprises at least one of a main picture decode device for decoding the main picture information included in the extracted main picture pack and an audio decode device for decoding the audio information included in the extracted audio pack.

According to this aspect, the main picture pack and/or the audio pack are extracted by the extract device from the information read by the read device. Then, the main picture information, and/or the audio information included in the extracted main picture pack and/or the audio pack are decoded by the main picture decode device and/or the audio decode device, respectively. Thus, the main picture information, the sub picture information and the audio information can be reproduced together in correspondence with each other as for the time, and the highlight display and the operation display of the sub picture as well as the reproduction outputs of the main picture information and/or the audio information can be performed precisely as for the time. As a result, an information reproducing apparatus for the DVD, which is capable of performing the interactive reproduction while performing the highlight display and the button operations or the like together with the main picture and/or the audio sound at precise timings, can be realized.

In another aspect of the information reproducing apparatus of the present invention, the control device controls the sub picture decode device to superimpose the decoded sub picture information on the decoded main picture information, in accordance with to the decoded reproduction control information.

According to this aspect, the highlight display and the operation control of the sub picture, which is superimposed on the main picture, can be performed precisely as for the time, by use of a rather simple hardware construction and algorithm.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 1A is a perspective view of the DVD in FIG. 1;

FIG. 5 is a table showing a data structure of highlight general information included in the highlight information of FIG. 4;

FIG. 7 is a diagram showing a data structure of information indicating highlight start point in the highlight general information of FIG. 5;

DETAILED DESCRIPTION OF THE PREFERRED EMBODIMENTS

Referring to the accompanying drawings, embodiments of the present invention will be now explained. The following explanations will be done for the embodiments, in which the present invention is applied to the aforementioned DVD.

In the following embodiments, constitutional elements listed on a right hand side in a following list respectively construct examples of constitutional elements of the present invention listed on a left hand side in the following list.

| data group | VOBU ((Video OBject) Unit) |
| reproduction control information | PCI (Presentation Control Information) |
| control pack | navi-pack |
| main picture pack | video pack |

(I) Embodiment of Information Record Medium

First of all, a physical structure and a logical structure as well as an operation of a DVD, as one embodiment of the information record medium to which the present invention is applied, will be explained with reference to FIGS. 1 to 8.

Figure 1:
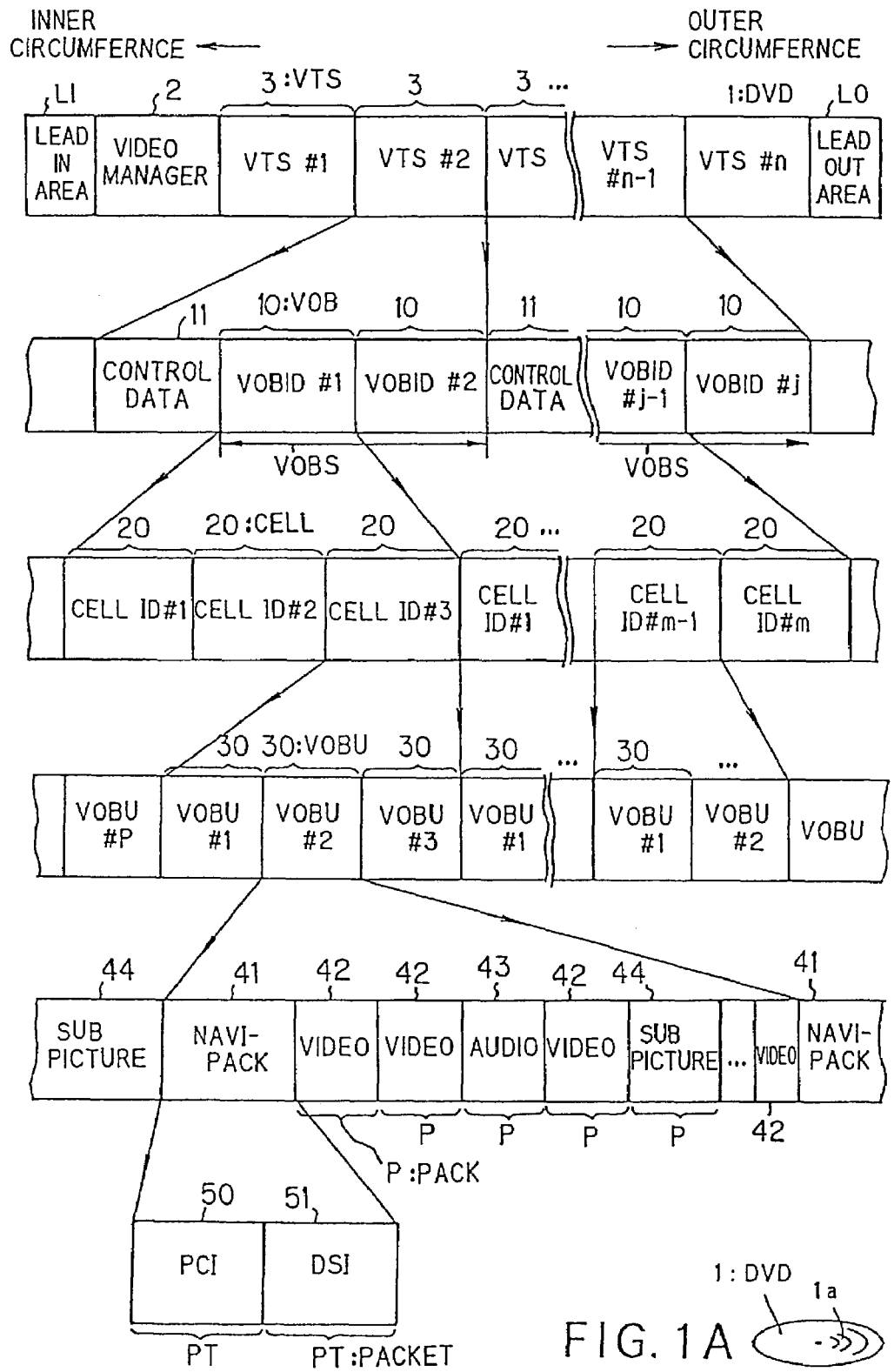
FIG. 1 is a diagram showing a physical structure of record information of a DVD as one embodiment of the present invention.

At first, a record format of video information and audio information on a record track of the DVD (i.e. a physical record format) is explained by use of FIG. 1.

As shown in FIG. 1, a DVD 1 as the present embodiment is provided with a lead in area LI at its most inner circumferential portion and a lead out area LO at its most outer circumferential portion, between which video information and audio information are recorded along the record track such that they are divided into a plurality of VTSs 3, each of which has a unique ID (Identification) number (i.e. VTS#1 to VTS#n). Here, the VTS (Video Title Set) 3 is a set (bundle) of titles (each of which is one production or one work which an author or producer intends to offer to the audience), which are related to each other (e.g., which attribute, such as the number, the specification, the corresponding languages etc. of audio and video streams is the same to each other). More concretely, a plurality of movies which are related to the same movie to each other but which languages of serifs (lines) are different from each other may be recorded as different titles respectively, or even in case of the same movies, the theater version and the special version may be recorded as different titles respectively. Ahead of the area where the VTSs 3 are recorded, a video manager 2 is recorded as shown in FIG. 1. As the information recorded in the video manager 2, for example, information related to the whole video and audio information recorded on the DVD 1, such as a menu for showing a name of each title, information for preventing an illegal copy, an access table for directly accessing each title and so on, is recorded.

These video, audio and control informations are recorded on a spiral or coaxial record track 1a of the DVD 1 as shown in FIG. 1A.

One VTS 3 is recorded such that it is divided into a plurality of VOBs 10, each of which has an ID number (VOB ID#1, VOB ID#2, . . . ), and control data 11 disposed ahead of the VOBs 10. Here, a data portion constructed by a plurality of VOBs 10 is defined as a VOB set (VOBS) as shown in FIG. 1. This VOB set is defined to distinguish the VOB 10, which constructs one portion of the VTS 3 as the substantial portion of the video and audio information, from the control data 11, which constructs another portion of the VTS 3.

In the control data 11 recorded at the head of the VTS 3, information such as PGCI (ProGram Chain Information), which is various information related to a program chain as a logical division obtained by combining a plurality of cells (the "cell" will be described later in detail), is recorded. In each VOB 10, the substantial portion of the video and audio information (i.e. the video and audio information itself other than control information) besides the control information are recorded.

Further, one VOB 10 is constructed of a plurality of cells 20, each of which has an-ID number (cell ID#1, cell ID#2, . . . ). Here, one VOB 10 is constructed such that it is completed by the plurality of cells 20 and that one cell 20 does not strides over two VOBs 10.

Nextly, one cell 20 is constructed of a plurality of VOB units (VOBUs) 30, each of which has an ID number (VOBU#1, VOBU#2, . . . ). Here, the VOB unit 30 is an information unit, each of which includes the video information, the audio information and sub picture information (which is defined as information of a sub picture such as a subtitle of a movie etc.).

One VOB unit 30 is provided with: a navi-pack (a navigation pack) 41 for storing various control data; a video pack 42 for storing video data; an audio pack 43 for storing audio data; and a sub picture pack 44 for sub picture data. Here, in the video pack 42, a packet including the video data together with additional information such as header thereof is recorded. In the audio pack 43, a packet including the audio data together with additional information such as header thereof is recorded. Further, in the sub picture pack 44, a packet including graphics such as a character and a diagram as the sub picture, together with additional information such as header thereof, is recorded. In the video packs 42, which data amount is relatively large as shown in FIG. 1, one or a plurality of GOPs are recorded within one VOB unit 30. The audio pack 43 and the sub picture pack 44 are disposed intermittently between the video packs 42.

It is prescribed by a standard specification of the DVD that there are 8 kinds of audio recordable on the DVD 1 while 32 kinds of sub picture recordable on the DVD 1. Further, there always exists the navi-pack 41 in one VOBU 30. On the other hand, there may not exist each of the video pack 42, the audio pack 43 and the sub picture pack 44 in one VOBU 30, or, even in case that these packs exist in one VOBU 30, the number of the packs and the order of the packs are freely determined.

Finally, the navi-pack 41 is provided with: a DSI (Data Search Information) packet 51 including search information to search a video image or an audio sound desired to be displayed or sound-outputted (concretely, search information such as an address, where the video or audio to be displayed or sound-outputted is recorded, on the DVD 1); and a PCI (Presentation Control Information) packet 50 including information related to a display control at a time of displaying the video image or outputting the audio sound, which is searched on the basis of the information of the DSI packet 51. Further, the video data included in one VOBU 30 consist of at least one GOP (Group Of Pictures). In the PCI packet 50, high light information, which defines a display or operation at a time when one selection item is selected out of selection items by the audience, is included. By the high light information, for example, the change of the picture plane display as well as the display position to be changed with respect to the selection item selected on a special picture plane of selection items (i.e. a so-called menu picture plane) for the audience to select, and the command corresponding to the selected item (i.e. a command to be performed in correspondence with the selected item) are set.

The video information to construct and display a frame, a selection button and the like, which is required to construct and display the menu picture plane, is recorded in the sub picture pack 44 as the sub picture information.

Further, the above described GOP is a minimum picture unit, which can be independently reproduced and which is determined by a standard based on the MPEG (Moving Picture Experts Group) 2 method. The MPEG 2 method is a picture compression method adopted at a time of recording the video information onto the DVD 1 in the present embodiment.

Here, the outline of the MPEG 2 method is explained. Namely, in general, frame pictures forward and backward of one frame picture in continuous frame pictures are often resembled to each other and have mutual relationships. The MPEG 2 method is a method, which is proposed by paying an attention to this fact, and which generates one frame picture existing between a plurality of frame pictures on the basis of the plurality of frame pictures transferred while they are timely separated by a few or several frames from each other, by means of an interpolating calculation based on moving vectors etc. of the original picture. In this case, if this one frame picture is to be recorded, it is enough to just record the information as for a differential vector and a moving vector thereof with respect to the plurality of frame pictures, so as to reproduce this one frame picture by estimating it from the plurality of frame pictures with referring to these vectors, at a time of reproduction. By this, the compression recording is enabled with respect to the picture.

The MPEG 2 method used in the present embodiment employs a variable rate method, in which the data amount included in each GOP is not constant.

In the above explained record format having a hierarchical structure as shown in FIG. 1, each division can be freely set according to the author's intention, so as to perform recording on the basis of these set divisions. By performing the reproduction on the basis of a later described logical structure for each of these divisions, the variegated reproduction can be performed.

Nextly, a logical format (logical structure) constructed by combining the information recorded by the physical divisions shown in FIG. 1 is explained with reference to FIG. 2. The information is not actually recorded on the DVD 1 in the logical structure of FIG. 2. Instead, information (e.g. access information or time information) to reproduce each data shown in FIG. 1 by combining them (especially combining the cells 20) in the logical structure shown in FIG. 2, is recorded on the DVD 1, especially in the control data 11.

Figure 2:
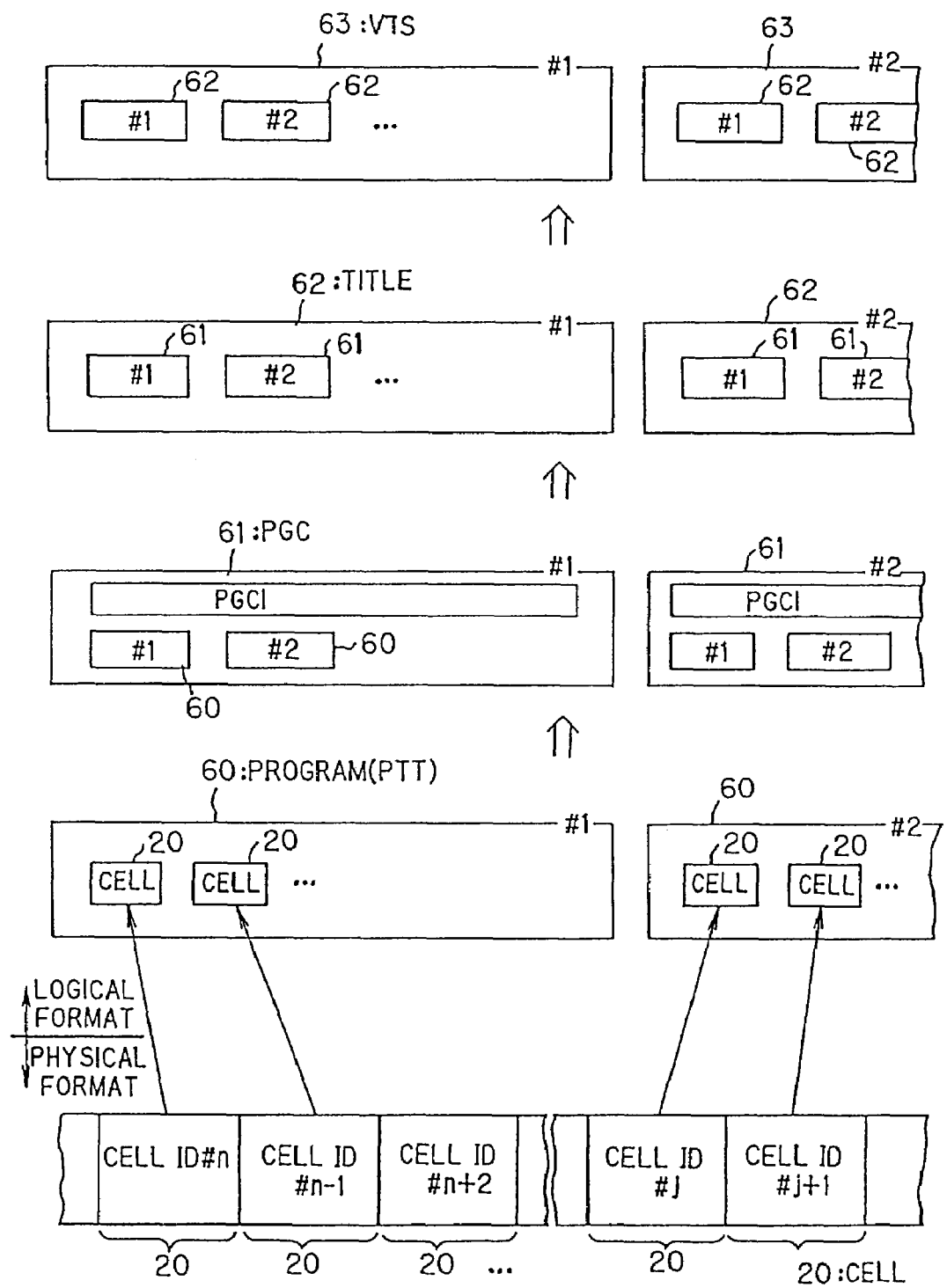
FIG. 2 is a diagram showing a logical structure of the record information of the DVD in FIG. 1.

To make the explanation clear, the following explanation is made from the lower hierarchical layer in FIG. 2. One program 60 is logically constructed on the basis of the author's intention by selecting and combining a plurality of cells 20 among the physical structures explained by use of FIG. 1. The program 60 is also a minimum logical unit, which division can be identified by a system controller of a reproducing apparatus described later and which can be accessed by use of a command by the system controller. It is also possible for the author to define a gathering of one or more programs 60 as a minimum unit, which can be freely selected to be watched or listened to by the audience and which is referred to as a PTT (ParT of Title).

Since one program 60 is logically constructed by selecting a plurality of cells 20, it is possible to use one cell commonly for a plurality of programs 60, namely to perform a so-called "alternative usage" of the cell 20 in which one cell 20 is reproduced in a plurality of different programs 60.

Here, as for the number of each cell 20, at a time of treating the cell 20 on the physical format shown in FIG. 1, the number is treated as the cell ID number (which is indicated by cell ID # in FIG. 1). On the other hand, at a time of treating the cell 20 on the logical format shown in FIG. 2, the number is treated as the cell number in the order of description in the PGCI described later.

Next, by combining a plurality of programs 60, one PGC (Program Chain) 61 is logically constructed on the basis of the author's intention. The aforementioned PGCI (ProGram Chain Information) is defined by a unit of the PGC 61. The PGCI includes information indicating: the reproduction order of the cells 20 for each program 60 at a time of reproducing each program 60 (by this reproduction order, a unique program number (#1, #2, . . . ) is assigned to each program 60); the reproduction order for each cell 20 (by this reproduction order, a unique cell number is assigned to each cell 20); an address which is a record position of each cell 20 on the DVD 1; the number of the cell 20 positioned at the head of one program 60 to be firstly reproduced; a reproduction method for each program 60 [it is possible for the author to select one reproduction method for each PGC 61 out of (i) a random reproduction (which is a random reproduction by use of random numbers, and the same program 60 may be reproduced by a plurality of times), (ii) a shuffle reproduction (which is a random reproduction by use of random numbers in the same manner as the random reproduction, but one program 60 is reproduced just once but not reproduced by a plurality of times), (iii) a loop reproduction (which is a reproduction to reproduce one PGC 61 repeatedly), and (iv) a combination of the loop reproduction with the random reproduction or the shuffle reproduction, as a reproduction method to be employed at a time of reproduction]; and various commands (e.g. commands able to be specified by the author for each PGC 61 or each cell 20). The recording position of the PGCI on the DVD 1 may be in the control data 11 as aforementioned, or in a control data (not illustrated) in the video manager 2 if the pertinent PGCI is related to the menu in the video manager 2 (refer to FIG. 1).

In one PGC 61, the substantial video and audio data etc. are included as a combination of the programs 60 (in other words, the combination of the cells 20) other than the above mentioned PGCI.

Further, in one PGC 61, it is possible to perform the alternative usage of the cell 20 as explained before in the explanation for the program 60 (i.e. such a usage that the same cell 20 is commonly used by a plurality of different PGC 61). As the method of reproducing the cell 20 to be used, the author can select a method of reproducing the cells 20 in an order regardless of the recording order on the DVD 1 (i.e. the method of reproducing the cells discontinuously arranged, for example, the method of reproducing the cell 20 prior which is recorded posterior on the record track) other than a method of reproducing the cell 20 in the recording order on the record track on the DVD 1 as it is (i.e. the method of reproducing the cells continuously arranged).

Then, one title 62 is logically constructed of one or a plurality of PGCs 61 (PGC #1, PGC#2, . . . ) as shown in FIG. 2. The title 62 is, for example, a unit corresponding to one movie, and is completed information which the author would like to offer to the audience of the DVD 1.

Finally, one VTS 63 is logically constructed of one or a plurality of titles 62 (title #1, title #2, . . . ) as shown in FIG. 2. The title 62 included in the VTS 63 has the attributes common to each other. For example, the movies based on one movie but in different languages correspond to the respective titles 62. The information included in one VTS 63 shown in FIG. 2 corresponds to information included in one VTS 3 shown in FIG. 1. Namely, all information included in the logical VTS 63 shown in FIG. 2 is recorded as one VTS 3 in the DVD 1 shown in FIG. 1.

As the author specifies the information divided in the physical structure on the DVD 1 on the basis of the above described logical format, the video image (e.g. the movie image) for the audience to watch is to be formed.

In the explanations for the physical structure shown in FIG. 1, for the easy understanding of the content, it has been explained such that a plurality of cells 20 are recorded in the order of the ID numbers. However, in the DVD 1 of the present embodiment, one cell 20 may be divided into a plurality of interleaved units IU to be actually recorded on the DVD 1, as shown in FIG. 3.

Figure 3:
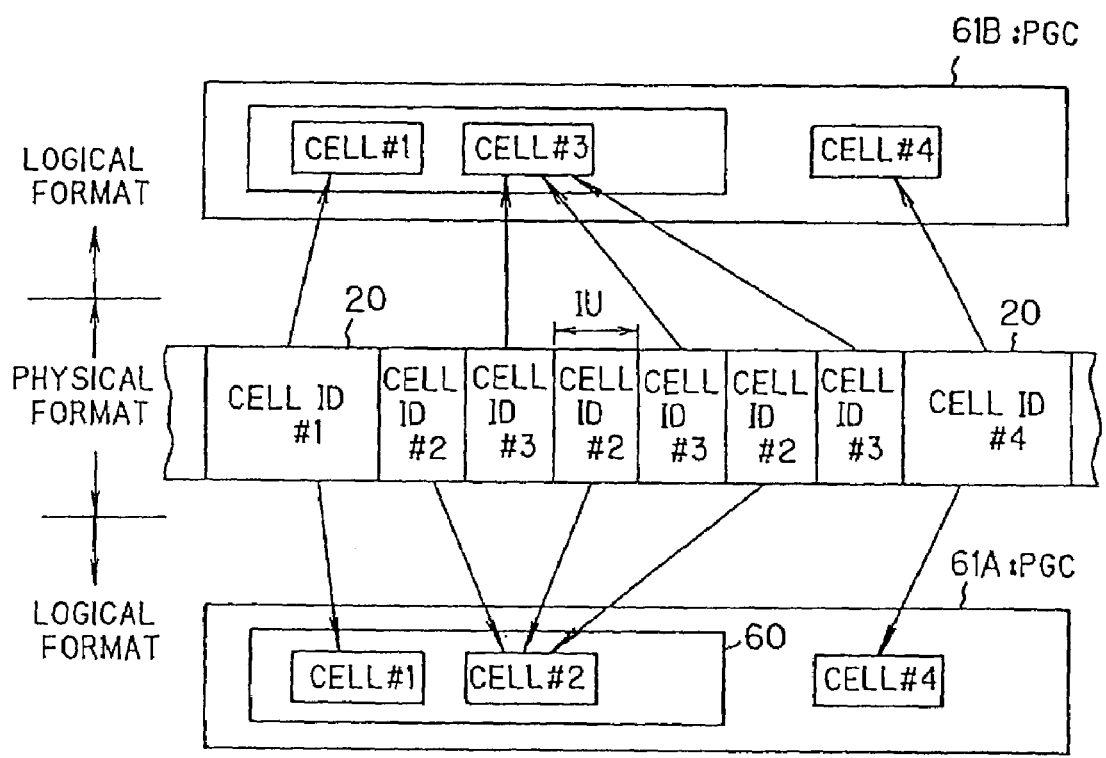
FIG. 3 is a diagram showing a structure of an interleaved unit of the DVD in FIG. 1.

Namely, as shown in FIG. 3, it is assumed that the author constructs one PGC 61A of the cells 20 having the ID numbers 1, 2 and 4, and constructs another PGC 61B of the cells 20 having the ID numbers 1, 3 and 4. In this case, at a time of reproducing the information from the DVD 1 on the basis of the PGC 61A, only the cells having the ID numbers 1, 2 and 4 are reproduced, while, at a time of reproducing the information from the DVD 1 on the basis of the PGC 61B, only the cells 20 having the ID numbers 1, 3 and 4 are reproduced. In the case of the PGC 61A for example, if the cells 20 are recorded spaced from each other for each ID number, a certain time period to jump the optical pickup from the record position of the cell 20 having the ID number 2 on the DVD 1 to the record position of the cell 20 having the ID number 4 on the DVD 1 is required in the reproduction. This results in that the continuous reproduction (hereinafter, it is referred to as a "seamless reproduction") of the cell 20 having the ID number 2 and the cell 20 having the ID number 4 may not be possible depending on a capacity of a track buffer of the reproducing apparatus described later.

Therefore, in the case shown in FIG. 3, the cell 20 having the ID number 2 and the cell having the ID number 3 are divided into interleaved units IU and are recorded by the interleaved units IU, each having a length, which does not destroy the continuity of an output signal of the track buffer even if an input signal to the track buffer is temporarily stopped, in correspondence with an input and output processing speeds at the track buffer (i.e. the interleaved units IU, each having a length which allows the track buffer to continuously output the output signal even if the input signal to the track buffer is ceased while the optical pickup jumps for the interval of one interleaved unit IU). For example, in case of reproduction based on the PGC 61A, only the interleaved units IU constructing the cell 20 corresponding to the ID number 2 are continuously detected to be reproduced. In the same manner, in case of reproduction based on the PGC 61B, only the interleaved units IU constructing the cell 20 corresponding to the ID number 3 are continuously detected to be reproduced. The length of the interleaved unit IU may be determined with considering the capability of a driving mechanism such as a slider motor to perform the track jump, in addition to the memory capacity of the track buffer.

In this manner, by dividing one cell 20 into a plurality of interleaved units IU and recording them according to the author's intention, the signal outputted from the track buffer can be continuous even at a time of reproducing the PGC 61 including the cells 20 having the discontinuous ID numbers, so that it is possible for the audience to watch continuous reproduction video image.

Each interleaved unit IU is completed in one VOB 10, and does not stride over two adjacent VOBs 10. As for the relationship between the interleaved unit IU and the VOB unit 30, one or a plurality of VOB units 30 are included in one interleaved unit IU. One VOB unit 30 is completed in one interleaved unit IU, and is not divided into a plurality of interleaved units IU or does not strides over a plurality of interleaved units IU.

Nextly, the highlight information of the DVD 1 having the above described physical and logical structures as a feature of the present invention is explained in more detail with reference to FIGS. 4 to 8.

Figure 4:
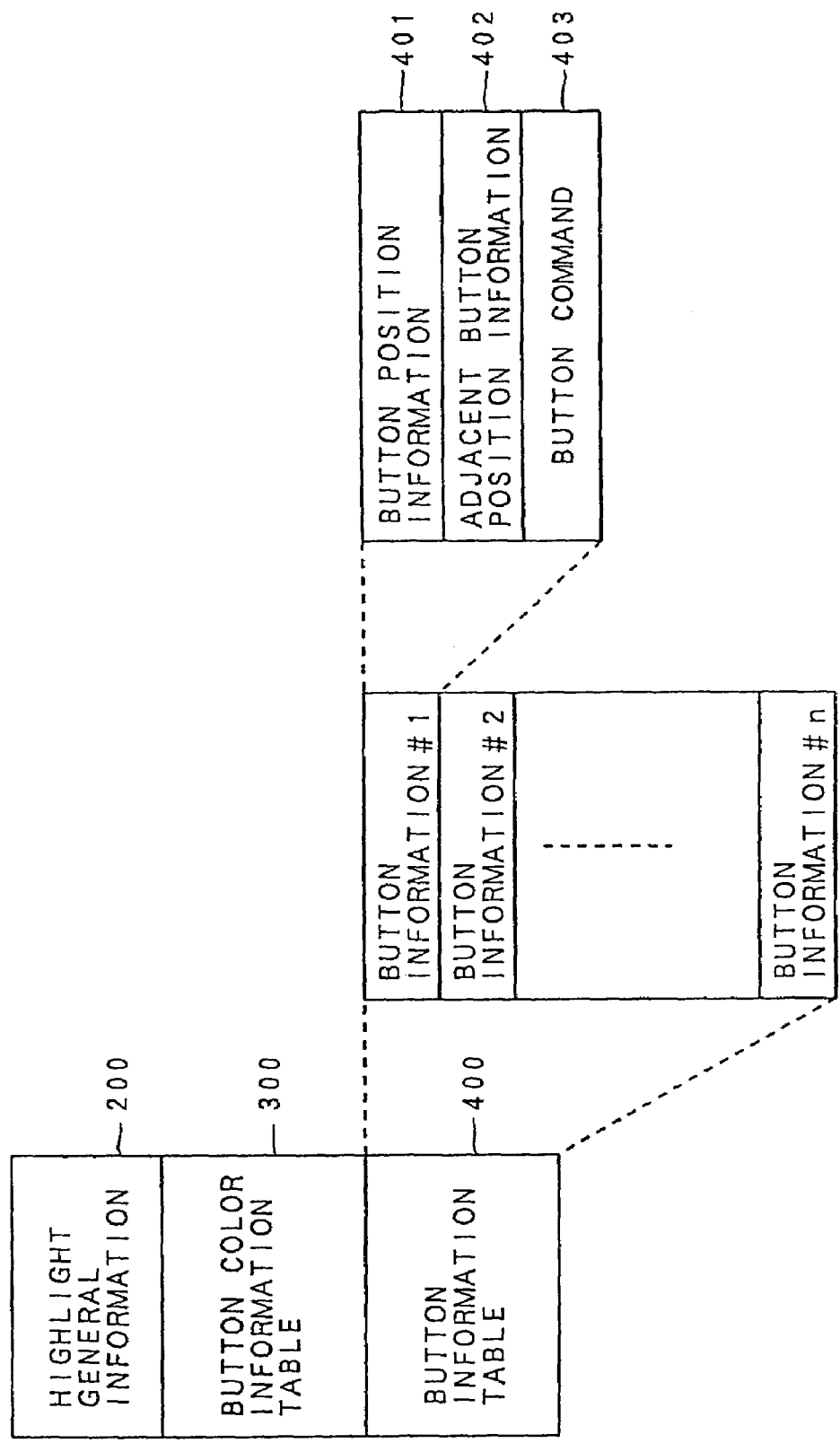
FIG. 4 is a diagram showing a data structure of highlight information described in a PCI packet of each navi-pack of the DVD of FIG. 1.

As shown in FIG. 4, the highlight information is provided with highlight general information 200, button color information table 300 and button information table 400. Here, the "button" is defined as a selection branch or option displayed by the sub picture, and also as an object highlighted by the highlight information. As this button, there is a selection button in the menu formed by the sub picture on the background of the main picture, by the information reproducing apparatus, for example. In this case, when the audience moves the cursor to a certain selection button to select it and presses a confirmation button so as to reproduce the selected title, the highlight display is performed in dependence upon the condition at that time with respect to the button, so that the button command is executed at the time of confirming and the search or the like is performed. In order to realize this kind of operation, the button color information table 300 is a table to define the highlight accompanying the selection or confirmation operation by the audience (e.g. the change of the color of the button) for each of the buttons. The button information table 400 is a table to describe: the position of each button on the picture plane; the button at a movement destination when the highlight moving operation by use of the cursor is performed; and the button command to be executed when confirming the button, as for each of the buttons (i.e. the button information #1 to #n in FIG. 4). Namely, as shown in FIG. 4, each button information is constituted by button position information 401, adjacent button position information 402 and a button command 403. It is possible to define a group as for a plurality of buttons. In that case, the contents in the button color information table and the button information table are described as for each of the groups.

The highlight general information shown in the table of FIG. 5 is written as one portion or whole of the highlight information in the PCI packet 50 within the navi-pack 41 in FIG. 1.

In FIG. 5, the highlight general information HL-GI has: 2 bytes information 201 including HLI-SS data indicative of a "highlight status"; 4 bytes information 202 including HLI-SPTS data indicative of a "highlight start point (presentation time stamp)"; and 4 bytes information 203 including HLI-EPTS data indicative of a "highlight end point (presentation time stamp)", each of which has a data structure described later in detail. The highlight general information also has: 1 byte information including BTN-MD data indicative of a "button mode" to be displayed by the button information; 1 byte information including BTN-SN data indicative of a "button start number" i.e., from which button number the button to be displayed is started; 1 byte information including BTN-NS data indicative of a "number of buttons" which is the total number of the buttons to be displayed; 1 byte information including NSBTN-NS indicative of a "number of numerical selection buttons" which is the total number of the numerical buttons to be displayed; 1 byte information including FSLBTN-N data indicative of a "forcedly selected button number" which is the button number forcedly selected by the information reproducing apparatus; and 1 byte information including FACBTN-N data indicative of a "forcedly actuated button number" which is the button number to be forcedly actuated by the information reproducing apparatus. In this manner, the highlight general information HL-GI is information related to the whole of the highlight information and having the total size of 16 bytes.

Nextly, the 2 bytes information 201 indicative of the "highlight status" is explained with reference to FIG. 6.

Figure 6:
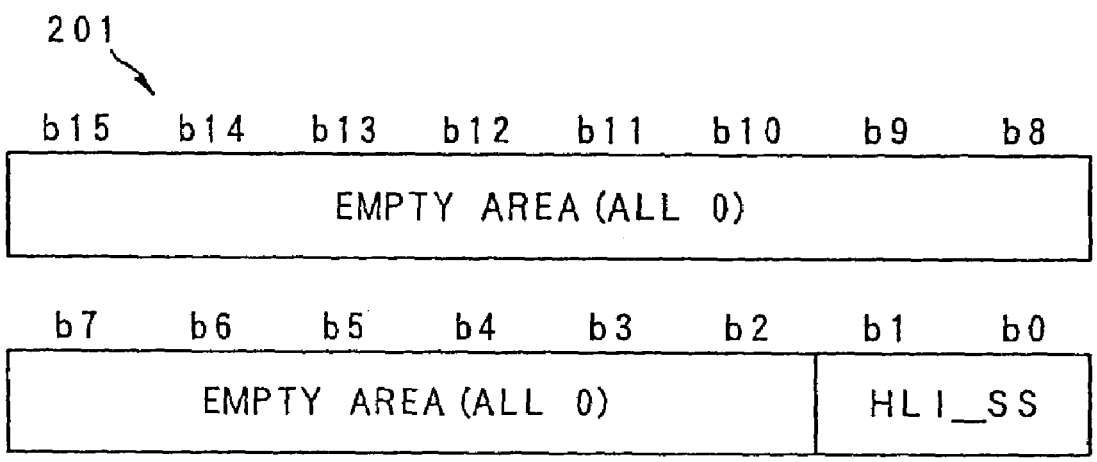
FIG. 6 is a diagram showing a data structure of information indicating a highlight status included in the highlight general information of FIG. 5.

In FIG. 6, the HLI-SS data of 2 bytes is written in the bits b0 and b1 in the information 201 indicative of the "highlight status". The HLI-SS data indicates, by the data value "00" thereof, the fact that no effective highlight information exists. The HLI-SS data indicates, by the data value "01" thereof, the fact that the highlight information exists in the pertinent PCI packet within the pertinent navi-pack of the pertinent VOBU, which is different from that of a previous VOBU. Further, the HLI-SS data indicates, by the data value "10" thereof, the fact that the highlight information exists in the pertinent PCI packet within the pertinent navi-pack of the pertinent VOBU, which is the same as that of the previous VOBU. Furthermore, the HLI-SS data indicates, by the data value "11" thereof as one example of the highlight partially identical information, the fact that the highlight information exists in the pertinent PCI packet within the pertinent navi-pack of the pertinent VOBU, which is different only in the button command BTN-CMD from that of the previous VOBU, and the remaining portion is the same as that of the previous VOBU.

The bits b2 to b15 in this information 201 indicative of the "highlight status" are formed as an empty area for the future use, and all of these bits are set to "0". Incidentally, if the value of the HLI-SS data is "00", the content of the pertinent highlight general information HL-GI is made ineffective except for this HLI-SS. Thus, the description contents are not specified as for each information in this case.

Nextly, the 4 bytes information 202 indicative of the "highlight start point" as one example of the time management information is explained with reference to FIG. 7. To the information 202 indicative of the "highlight start point", the highlight start time is described as following, at which the highlight information is made effective in case that the highlight information is indicated to be effective by the above described information 201 indicative of the "highlight status". Namely, the information 202 indicates the highlight start time as for new highlight information in case that the HLI-SS data has the data value "01", and indicates the highlight start time as for the previous highlight information, which is previous to the present and is continued to the present VOBU, in case that the HLI-SS data has the data value "10" or "11". Incidentally, the highlight start time must be not shorter (i.e. not earlier) than the display start time of the sub picture as an object of the pertinent highlight information.

In FIG. 7, the HLI-SPTS data is written in all of the bits b0 to b31 (total 32 bits) in this information 202 indicative of the "highlight start point". Here, as the highlight start time, the value, which is calculated by use of a predetermined calculation formula (HLI-SPTS value=highlight start time (sec)×90000 (Hz)), is described as binary data to the bits b0 to b31. The HLI-SPTS data expresses the time, at which the top byte of the video frame of the sub picture data corresponding to the pertinent highlight start is to be outputted from the decoder of the reproducing apparatus, and specifies it by the unit of 90 kHz. Here, the reason for employing here the frequency value of 90 kHz is that it is the common multiple of the frequencies of the video frames such as the NTSC method, the PAL method etc., so that its congeniality in frequency with the video data is good.

Nextly, the 4 bytes information 203 including the HLI-EPTS data indicative of the "highlight end point" as one example of the time management information is explained with reference to FIG. 8. To this information 203 indicative of the "highlight end point", in case that the highlight information is indicated to be effective by the aforementioned information 201 indicative of the "highlight status", the highlight start time, at which the highlight information is made effective, is described as following. Namely, the information 203 indicates the highlight end time as for new highlight information in case that the HLI-SS data has the data value "01", and indicates the highlight end time as for the previous highlight information which is previous to the present and is continued to the present VOBU in case that the HLI-SS data has the data value "10" or "11". Incidentally, the highlight end time must be not longer (i.e. not later) than the display end time of the sub picture as an object of the pertinent highlight information.

Figure 8:
FIG. 8 is a diagram showing a data structure of information indicating a highlight end point in the highlight general information of FIG. 5.

In FIG. 8, the HLI-EPTS data is written in all of the bits b0 to b31 (total 32 bits) in this information 203 indicative of the "highlight end point". Here, as the highlight end time, the value calculated by use of a predetermined calculation formula (HLI-EPTS value=highlight end time (sec)×90000 (Hz)) is described as binary data to the bits b0 to b31. The HLI-EPTS data expresses the time, at which the top byte of the video frame of the sub picture data corresponding to the pertinent highlight end is to be outputted from the decoder of the reproducing apparatus, and specified it by the unit of 90 kHz in the same manner as the HLI-SPTS data.

As described above in detail, the information indicative of the start point and the end point of the highlight display is written in the highlight general information HL-GI included in the PCI packet in each navi-pack, in the DVD of the present embodiment. Thus, it is possible to specify the start of the highlight display from a desired point of time, and it is further possible to specify the end of the highlight display at a desired point of time. As a result, in the information reproducing apparatus described later, on the basis of the information indicative of the start point and the end point, for example, it is possible to perform the highlight display of the sub picture precisely as for the time, on the GUI picture plane constituted by superimposing the sub picture on the main picture.

Incidentally, such a button command may be included in the highlight information, as is to set a value of a specific register in a controller of the information reproducing apparatus described later or is to jump the reading position to a certain portion on the DVD, in addition to the above explained highlight general information HL-GI. For example, it is assumed here such a case that the record information recorded on the DVD 1 is the educational software, and that the selection items composed of a plurality of answer candidates or options to be selected by the audience after displaying a question is displayed as the sub picture. In this case, the button command corresponding to the selection item is included in the highlight information, and, if the correct answer item is selected by the highlight display, some point is added to the specific register, while, if the incorrect answer item is selected by the highlight display, this point addition is not executed. Then, the sequences of displaying the question and answering the question are repeated in the same manner, and, at the end of answering all the question, the total score (points) accumulated in the specific register is referred to. Then, if this total score is equal to or higher than a predetermined satisfactory score value, the reading position is moved to another track where the questions on the next study stage are recorded on the DVD 1. On the other hand, if this total score is lower than the predetermined satisfactory score value, the reading position is moved to another track where the questions for reviewing are recorded on the DVD 1. As explained above, the button command to set the specific register of the controller of the reproducing apparatus and/or to jump the reading position to a specific position may be included in the highlight information. Further, if such a button command exists, the start point and the end point of the effective time period or duration as for the execution of the button command may be defined by the highlight start and end times. Namely, only during the time period or duration between the highlight start and end times, the button command is executed in correspondence with a selected button when a certain selection item (button) is selected. Other than that time period or duration, even if the selection item is selected, the corresponding button command is not executed. Incidentally, if the information 201 has the value "11" and if the highlight information is different only in the button command from the previous highlight information, the new button command is made effective from the reproduction start time (i.e. the start PTS (Presentation Time Stamp)) of the VOBU including the PCI packet including the pertinent information 201.

Since the DVD has such a large memory capacity that, in addition to one movie, the audio voices and captions (titles) in a plurality of kinds of languages corresponding to this one movie can be recorded on a single optical disk, it is effective to apply the above described record format especially to the DVD 1.

(II) Embodiment of Recording Apparatus

Next, an embodiment of recording apparatus for recording the above mentioned control information, video information and audio information onto the DVD 1 will be explained with reference to FIG. 9.

At first, a construction and an operation of the recording apparatus as the embodiment is explained with reference to FIG. 9.

Figure 9:
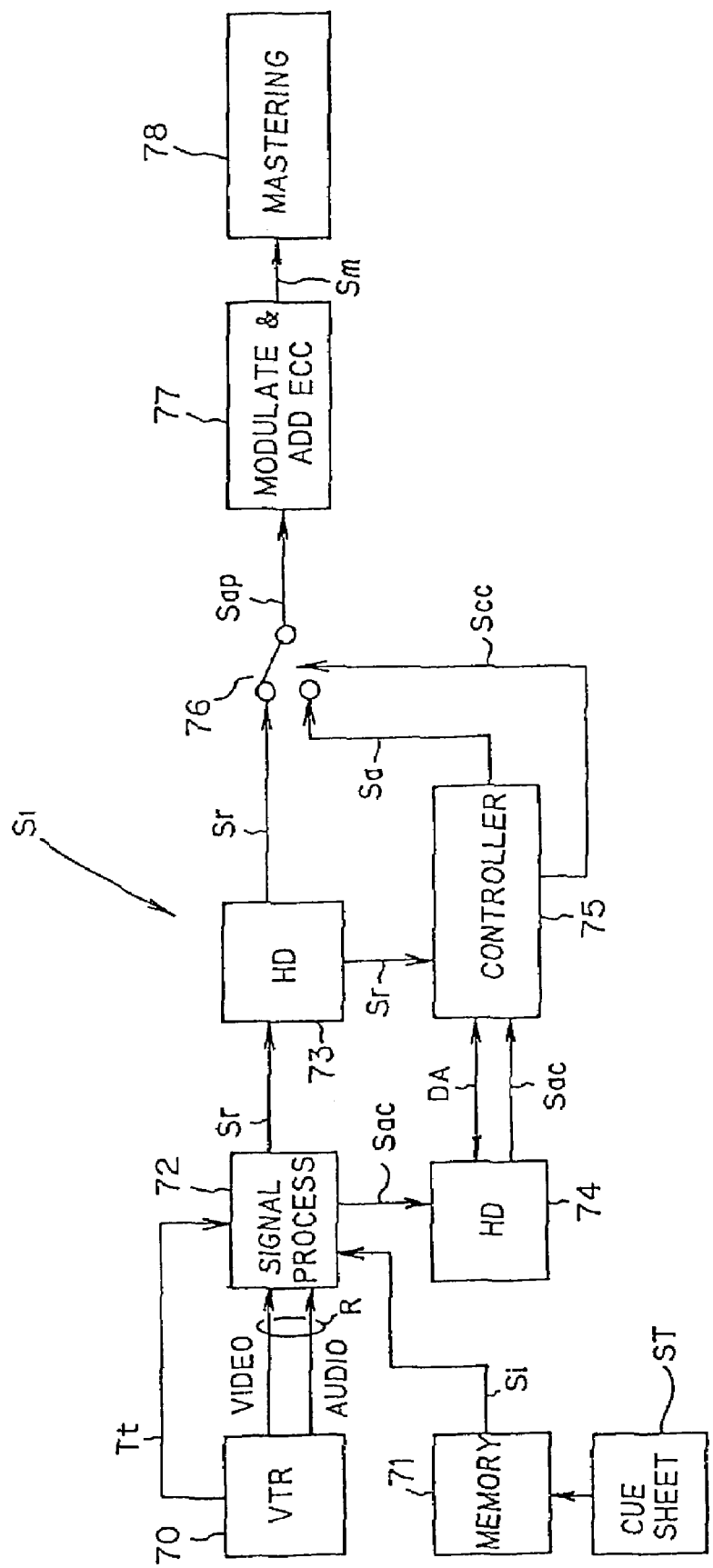
FIG. 9 is a block diagram of an information recording apparatus for recording the DVD in FIG. 1, as another embodiment of the present invention.

As shown in FIG. 9, a recording apparatus S1 as the present embodiment is provided with: a VTR (Video Tape Recorder) 70; a memory 71; a signal process unit 71; a hard disk (HD) device 73; a hard disk (HD) device 74; a controller 75; a multiplexer 76; a modulator 77; and a mastering device 78.

Nextly, an operation of the present embodiment is explained.

Record information R, which is a raw material such as audio information, video information etc. to be recorded on the DVD 1, is temporarily recorded in the VTR 70. Then, the record information R temporarily record in the VTR 70 is outputted to the signal process unit 72 by a request from the signal process unit 72.

The signal process unit 72 applies an A/D (Analog to Digital) converting process and a signal compressing process to the record information R outputted from the VTR 70, and time-axis-multiplexes the audio information and the video information to output it as a compressed multiplexed signal Sr. After that, the compressed multiplexed signal Sr outputted therefrom is temporarily stored into the hard disk device 73.

Along with this, the memory 71 classifies the record information R into a plurality of partial record information Pr in advance, and temporarily stores content information related to the partial record information Pr which is inputted beforehand on the basis of a cue sheet ST, on which the user defined information such as the HLI-SS data indicating the highlight status shown in FIG. 6, the HLI-SPTS data indicating the highlight start point shown in FIG. 7, the HLI- EPTS data indicating the highlight end point shown in FIG. 8 and so on are written. Then, the memory 71 outputs it as a content information signal Si on the basis of a request from the signal process unit 72.

Then, the signal process unit 72 generates and outputs an access information signal Sac corresponding to the partial record information Pr with referring to a time code Tt, on the basis of the time code Tt corresponding to the record information R outputted from the VTR 70 and the content information signal Si outputted from the memory 71. Then, the access information signal Sac is temporarily stored in the hard disk device 74.

The above described processes are performed with respect to the whole record information R.

When the above described processes are finished as for the whole record information R, the controller 75 reads out the compressed multiplexed signal Sr from the hard disk device 73, reads out the access information signal Sac from the hard disk device 74, generates additional information DA on the basis of these read out signals, and stores the additional information DA into the hard disk device 74. This is because there may be a control signal, which content is determined in dependence upon a generation result of the compressed multiplexed signal Sr among various control signals. On the other hand, the controller 75 performs a time management for each of the operations of the signal process unit 72, the hard disk device 73 and the hard disk device 74, and reads out the additional information DA from the hard disk device 74, so that the controller 75 generates and outputs an additional information signal Sa corresponding to the read out additional information DA, and generates and outputs an information selection signal Scc to time-axis-multiplex the compressed multiplexed signal Sr and the additional information signal Sa.

After that, the compressed multiplexed signal Sr and the additional information signal Sa are time-axis-multiplexed by the multiplexer 76 to be outputted as an information added compressed multiplexed Sap. If there exists the sub picture information to be recorded, it is inputted, by other means such as a hard disk device not illustrated, to the signal process unit 72, so that it is processed in the same manner as the video and audio information thereat.

Then, the modulator 77 adds an error correction code (ECC), such as a Reed Solomon code, and applies a modulation such as an eight to sixteen (8-16) modulation with respect to the information added compressed multiplexed signal Sap outputted from the multiplexer 76, and generates and outputs a disk record signal Sm to the mastering device 78.

Finally, the mastering device 78 records the disk record signal Sm to a stamper disk, which becomes a master (i.e. a cutting dye) for the production of an optical disk. Then, by use of this stamper disk, an optical disk as a replica disk, which can be on sale in the general market, i.e. the DVD 1, can be produced by a replication device not illustrated.

Nextly, the processes of recording the highlight general information HL-GI of the information recording apparatus S1 are explained in more detail.

At first, the information selection signal Scc to indicate that the additional information signal is to be selected is outputted by the controller 75, at the timing corresponding to the access information signal Sac generated on the basis of the content information SI which specifies each item of the highlight general information HL-GI inputted by the cue sheet ST (e.g., the HLI-SS data indicative of the highlight status shown in FIG. 6, the HLI-SPTS data indicative of the highlight start point shown in FIG. 7, the HLI-EPTS data indicative of the highlight end point shown in FIG. 8 and so on). Then, the multiplexer 76 is switched to the side of the additional information signal Sa. Then, the highlight general information HL-GI is inputted to the modulator 77 as one portion of the additional information signal Sa constituting the PCI packet within each navi-pack, and is further inputted to the mastering device 78 as one portion of the disk record signal Sm. Nextly, the information selection signal Scc to indicate that the compressed multiplexed signal Sr is to be selected is outputted by the controller 75. Then, the multiplexer 76 is switched to the side of the compressed multiplexed signal Sr. Then, the video data, the audio data and the sub picture data of this VOBU are sequentially inputted to the modulator 77 as the information added compressed signal Sap. This operation is repeatedly performed with respect to a plurality of VOBUs, and is further repeatedly performed with respect to a plurality of VTSs.

As a result of the above, according to the present embodiment, the master disk in which the highlight general information HL-GL is constructed, which specifies the start point (start time) and end point (end time) of the highlight display with respect to the sub picture data in the PCI data within each navi-pack, can be manufactured.

(III) Embodiment of Reproducing Apparatus

Next, an embodiment of reproducing apparatus for reproducing the information recorded on the DVD 1 by the above mentioned recording apparatus S1 will be explained with reference to FIG. 10.

At first, a construction and an operation of the reproducing apparatus as the embodiment is explained with reference to FIG. 10.

Figure 10:
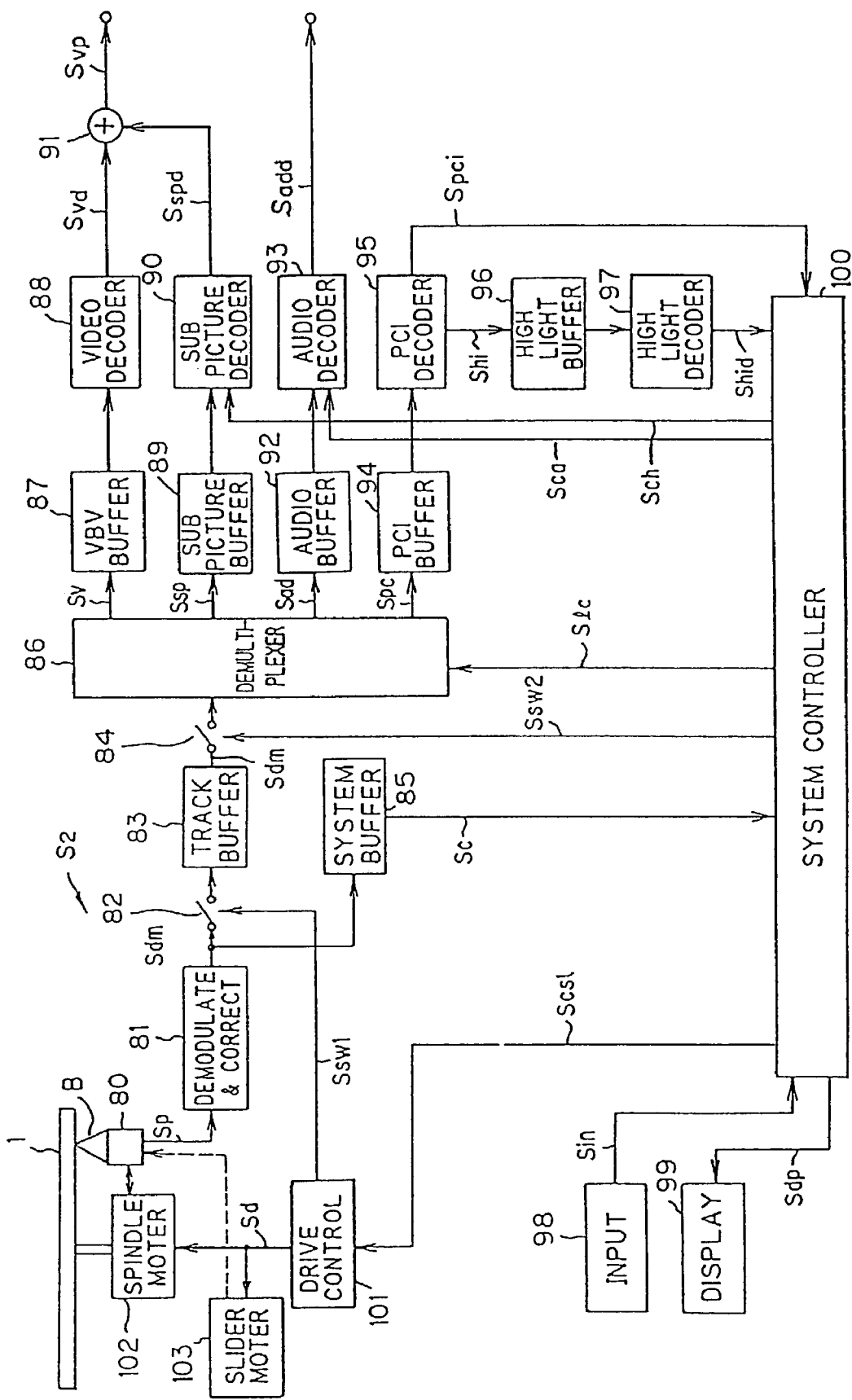
FIG. 10 is a block diagram of an information reproducing apparatus for reproducing the DVD in FIG. 1, as another embodiment of the present invention.

As shown in FIG. 10, a reproducing apparatus S2 as the present embodiment is provided with: an optical pickup 80; a demodulate and correct unit 81; stream switches 82 and 84; a track buffer 83; a system buffer 85; a demultiplexer 86; a VBV (Video Buffer Verifier) buffer 87; a video decoder 88; a sub picture buffer 89; a sub picture decoder 90; a mixer 91; an audio buffer 92; an audio decoder 93; a PCI (Presentation Control Information) buffer 94; a PCI decoder 95; a high light buffer 96; a high light decoder 97; an input unit 98; a display unit 99; a system controller 100; a drive controller 101; a spindle motor 102; and a slider motor 103. The construction shown in FIG. 10 only illustrates the portions related to the video and audio reproduction of the reproducing apparatus S2. The description and the detailed explanation as for servo circuits to servo-control the optical pickup 80, the spindle motor 102, the slider motor 103 and the like are omitted since they are constructed in the same manner as the conventional arts.

Nextly, an overall operation of the present embodiment is explained.

The optical pickup 80 includes a laser diode, a polarization beam splitter, an objective lens, a photo-detector and the like not illustrated, and irradiates a light beam B as a reproduction light with respect to the DVD 1. The optical pickup 80 receives a reflection light of the light beam B from the DVD 1, and outputs a detection signal Sp corresponding to information pits formed on the DVD 1. At this time, the tracking servo control and the focus servo control are operated with respect to the objective lens etc. of the optical pickup 80 in the same manner as the conventional art so that the light beam B can be irradiated precisely onto the information track of the DVD 1 and that the light beam B can be focused on the information record surface of the DVD 1.

The detection signal Sp outputted from the optical pickup 80 is inputted to the demodulate and correct unit 81, where a signal demodulation process and an error correct process are applied to it to generate a demodulation signal Sdm, which is outputted to the stream switch 82 and the system buffer 85.

The opening and closing operation of the stream switch 82, to which the demodulation signal Sdm is inputted, is controlled by a switch signal Ssw1 from the drive controller 101. When it is closed, the stream switch 82 passes therethrough the inputted demodulation signal Sdm as it is to the track buffer 83. When it is opened, the demodulation signal Sdm is not outputted therethrough, so that unnecessary or useless information (signal) is not inputted to the track buffer 83.

The track buffer 83, to which the demodulation signal Sdm is inputted, consists of a FIFO (First In First Out) memory, for example. The track buffer 83 temporarily stores the inputted demodulation signal Sdm, and continuously outputs the stored demodulation signal Sdm when the stream switch 84 is closed. The track buffer 83 compensates a difference or fluctuation in the data amount between respective GOP under the MPEG 2 method, and continuously outputs the demodulation signal Sdm, which is discontinuously inputted due to a track jump in the aforementioned seamless reproduction, in case of reading the data divided into the interleaved units IU, so as to avoid the interruption of the reproduction due to the discontinuity.

The opening and closing operation of the stream switch 84, to which the demodulation signal Sdm is continuously inputted, is controlled by a switch signal Ssw2 from the system controller 100 such that the various buffers at its posterior stage may not be over-flown or, on the contrary, may not become empty to stop the decoding process, in the separating process by the demultiplexer 86.

On the other hand, the system buffer 85, to which the demodulation signal Sdm is inputted in parallel with the track buffer 83, accumulates the management information (e.g. the video manager 2), the control data 11 of the VTS 3 and the like (refer to FIG. 1) which are detected firstly upon loading the DVD 1 and which are related to the whole information recorded on the DVD 1. Then, the system buffer 85 outputs the accumulated data as a control information Sc to the system controller 100, and temporarily stores the DSI packet 51 for each navi-pack 41 (refer to FIG. 1) as the occasion demands while reproducing the information, to output it also as the control information Sc.

The demultiplexer 86, to which the demodulation signal Sdm is continuously inputted through the stream switch 84, separates the video information, the audio information, the sub picture information and the PCI packet 50 for each navi-pack 41 respectively from the inputted demodulation signal Sdm, and outputs them as a video signal Sv, a sub picture signal Ssp, an audio signal Sad and a PCI signal Spc respectively to the VBV buffer 87, the sub picture buffer 89, the audio buffer 92 and the PCI buffer 94. The demultiplexer 86 sends the packet header etc. of each packet as the control signal Sdmx to the system controller 100. There may be a case where, in the demodulation signal Sdm, different streams of the audio information or the sub picture information in a plurality of different languages are included as the audio or sub picture information. In that case, a desirable language is selected for the audio or sub picture information by a stream selection signal Slc from the system controller 100, so that the audio or sub picture information in the desirable language is outputted to the audio buffer 92 or the sub picture buffer 89.

The VBV buffer 87, to which the video signal Sv is inputted, consists of a FIFO memory, for example. The VBV buffer 87 temporarily stores the video signal Sv and outputs it to the video decoder 88. The VBV buffer 87 compensates the difference or fluctuation in the data amount between respective pictures of the video signal Sv compressed by the MPEG 2 method. Then, the video signal Sv in which the differences in the data amount are compensated, is outputted to the video decoder 88, and is decoded by the MPEG 2 method to be outputted as a decoded video signal Svd to the mixer 91.

On the other hand, the sub picture buffer 89, to which the sub picture signal Ssp is inputted, temporarily stores the inputted sub picture signal Ssp, and outputs it to the sub picture decoder 90. The sub picture buffer 89 is to synchronize the sub picture information included in the sub picture signal Ssp with the video information corresponding to the sub picture information, and to output it. Then, the sub picture signal Ssp synchronized with the video information is inputted to the sub picture decoder 90 and is decoded to be outputted as a decoded sub picture signal Sspd to the mixer 91.

In a case where the sub picture signal Ssp includes video information to construct a frame, a selection button etc. for displaying the menu picture plane, the sub picture decoder 90 changes a display condition of the selection button etc. to be displayed, in the sub picture signal Sspd on the basis of a high light control information Sch from the system controller 100 to output it.

The decoded video signal Svd outputted from the video decoder 88 and the decoded sub picture signal Sspd outputted from the sub picture decoder 90 (which is in synchronization with the corresponding decoded video signal Svd) are mixed together by the mixer 91, and are outputted as a final video signal Svp to be displayed to a display device such as a CRT (Cathode Ray Tube) device not illustrated.

The audio buffer 92, to which the audio signal Sad is inputted, consists of a FIFO memory, for example. The audio buffer 92 temporarily stores the audio signal Sad and outputs it to the audio decoder 93. The audio buffer 92 is to synchronize the audio signal Sad with the video signal Sv or the sub picture signal Ssp including the corresponding video information, and delays the audio signal Sad in accordance with the output condition of the corresponding video information. Then, the audio signal Sad, which is time-adjusted to synchronize with the corresponding video information, is outputted to the audio decoder 93. Then, a predetermined decoding process is applied thereat to the audio signal Sad, and it is outputted as a decoded audio signal Sadd to a speaker etc. not illustrated. If it is detected by the system controller 100 that it is necessary to temporarily stop (pause) the audio voice in the reproduction immediately after accessing, a pause signal Sca is outputted from the system controller 100 to the audio decoder 93, so that the output of the decoded audio signal Sadd is stopped temporarily at the audio decoder 93.

The PCI buffer 94, to which the PCI signal Spc is inputted, consists of a FIFO memory, for example. The PCI buffer 94 temporarily stores the inputted PCI signal Spc and outputs it to the PCI decoder 95. The PCI buffer 94 is to synchronize the PCI packet 50, which is included in the PCI signal Spc, with the video information, the audio information and the sub picture information corresponding to the PCI packet 50, and apply the PCI packet 50 to the video information and the like. Then, from the PCI signal Spc, which is synchronized with the corresponding the video information and the like by the PCI buffer 94, a high light information included in the PCI packet 50 is separated or extracted by the PCI decoder 95, and is outputted as a high light signal Shi to the high light buffer 96. The portion of the PCI packet 50 other than the high light information is outputted as a PCI information signal Spci to the system controller 100.

The high light buffer 96, to which the high light signal Shi is inputted, consists of a FIFO memory, for example. The high light buffer 96 temporarily stores the inputted high light signal Shi and outputs it to the high light decoder 97. The high light buffer 96 is to time-compensate the high light signal Shi so as to precisely perform a change in the display condition of the selection item, which corresponds to the high light information, in correspondence with the sub picture signal Ssp which includes the video information for the high light information. Then, the time-compensated high light signal Shi is decoded by the high light decoder 97, and the information included in the high light signal Shi is outputted as a decoded high light signal Shid to the system controller 100. Here, the system controller 100 outputs the aforementioned high light control signal Sch to change the display condition by the high light information, on the basis of the decoded high light signal Shid.

On the basis of the control information Sc inputted from the system buffer 85, the control signal Sdmx inputted from the demultiplexer 86, the PCI information signal Spci inputted from the PCI decoder 95 and an input signal Sin inputted from the input unit 98 such as a remote controller, the system controller 100 outputs the aforementioned switch signal Ssw2, the language selection signal Slc, the pause signal Sca and the high light control signal Sch to correctly perform the reproduction corresponding to those input signals, and also outputs a display signal Sdp to display an operation condition etc. of the reproducing apparatus S2 to the display unit 99 such as the liquid crystal device.

Further, the system controller 100 outputs a seamless control signal Scs1 corresponding to the track jump process such as a search process etc., to the drive controller 101, when it detects by the control signal Sc or the aforementioned DSI data etc. that it is necessary to perform the track jump process such as a search in order to perform the seamless reproduction.

Then, the drive controller 101, to which the seamless control signal Scs1 is inputted, outputs a drive signal Sd to the spindle motor 102 or the slider motor 103. By this drive signal Sd, the spindle motor 102 or the slider motor 103 moves the optical pickup 80 such that the record position to be reproduced on the DVD 1 is irradiated with the light beam B (refer to an arrow of a broken line in FIG. 10), and the spindle motor 102 CLV-controls (Constant Linear Velocity-controls) the rotation number of the DVD 1. Along with this, the drive controller 101 outputs the aforementioned switch signal Ssw1 on the basis of the seamless control signal Scs1, so as to open the stream switch 82 when the demodulation signal Sdm is not outputted from the demodulate and correct unit 81 while the optical pickup 80 is being moved, and so as to close the stream switch 82 when the demodulation signal Sdm is started to be outputted, so that the demodulation signal Sdm is outputted to the track buffer 83.

Nextly, the process of highlight-displaying the sub picture information stored or packed in the PCI packet of each navi-pack, on the basis of the highlight general information HL-GI as a feature of the present embodiment is explained in more detail.

In the above explained reproduction process, the demultiplexer 86 outputs the PCI signal Spc corresponding to the PCI data contained in the PCI packet 50 of the navi-pack 41 as shown in FIG. 1. At this time, in the PCI signal Spc, the highlight signal Shi corresponding to the highlight information including the highlight general information HL-GI shown in the table of FIG. 5, is included. Then, this highlight signal Shi is extracted by the PCI decoder 95 from the PCI signal Spc outputted by the PCI buffer 94 at the start point or PTS (Presentation Time Stamp) of the corresponding VOBU, and is outputted to the system controller 100 as the decoded highlight signal Shid through the highlight butter 96 and the highlight decoder 97. Then, the system controller 100 performs the change of the display condition or the execution of the button command according to the highlight information, on the basis of the decoded highlight signal Shid, as following.

Namely, if the value of the HLI-SS data, which is included in the information 201 indicative of the "highlight status" shown in FIG. 6 and located at the head portion of the highlight general information HL-GI indicated by this decoded highlight signal Shid, is "00", since no effective highlight information exists, the highlight information included in the PCI packet thereafter is treated as ineffective and is not referred to. Then, the system controller 100 outputs to the sub picture decoder 90 the highlight control signal Sch to instruct that no highlight display is to be performed (alternatively, it does not output the highlight control signal Sch). Further, in this case, the button command doe not exist either.

On the other hand, if this value of the HLI-SS data is "01", the system controller 100 refers to all of the highlight information on and after the HLI-SS data, generates the highlight control signal Sch to instruct an execution of a new highlight display according to the content of the highlight information, and outputs it to the sub picture decoder 90, so as to execute the highlight display based on the highlight information included in the PCI packet in the navi-pack different from that of the previous VOBU. Further, the system controller 100 stores the new button command into the built-in memory thereof by referring to the highlight information, and executes the button command corresponding to the selection item (button) when either one of the buttons displayed by the sub picture is selected and confirmed. In this case especially, the HLT-SPTS data (see FIG. 7) indicative of the "highlight start point" at the accuracy of 90 kHz within the highlight general information HL-GI is referred to. Then, the highlight control signal Sch is generated such that the head byte of the video frame of the sub picture data corresponding to this highlight start is outputted from the sub picture decoder 90 at the highlight start time described in this referred data. Further, in this case, the HLT-EPTS data (see FIG. 8) indicative of the "highlight end point" at the accuracy of 90 kHz within the highlight general information HL-GI is referred to. Then, the highlight control signal Sch is generated such that the head byte of the video frame of the sub picture data corresponding to this highlight end is outputted from the sub picture decoder 90 at the highlight end time described in this referred data. Incidentally, the highlight start time must be not shorter (i.e. not later) than the display start time of the sub picture as an object of the highlight, while the highlight end time must be not longer (i.e. not earlier) than the display end time of the sub picture as the object of the highlight. Otherwise, the highlight display cannot be performed normally since the sub picture to be the object of the highlight display dose not exist. Further, as aforementioned, the button command, which is executed at the time when the button is selected and confirmed, is also effective only during the time period or duration between the highlight start time and the highlight end time.

If the value of this HLI-SS data is "10", the system controller 100 does not refer to the highlight information after the HLI-SS data, generates the highlight control signal Sch to instruct the execution of the highlight display as it is according to the highlight information read in at the time of the previous VOBU, and outputs it to the sub picture decoder 90, so as to perform the highlight display based on the highlight information included in the PCI packet of the navi-pack of the pertinent VOBU same as that of the previous VOBU. In this case, the previous button command is stored as it is.

Furthermore, if the value of this HLI-SS data is "11", only the button command BTN-CMD described in the pertinent highlight information is newly stored. Then, when the button is selected and confirmed, the content of this newly stored button command is executed. Also, the highlight control signal Sch to instruct that the highlight display according to the content of the highlight information other than the button command, which has been referred to at the time of the previous VOBU, is generated, and outputted to the sub picture decoder 90.

In this case also, the HLT-SPTS data (see FIG. 7) indicative of the "highlight start point" within the highlight general information HL-GI is referred to. Then, the highlight control signal Sch is generated such that the head byte of the video frame of the sub picture data corresponding to this highlight start is outputted from the sub picture decoder 90 at the highlight start time described in this referred data. Further, in this case, the HLT-EPTS data (see FIG. 8) indicative of the "highlight end point" within the highlight general information HL-GI is referred to. Then, the highlight control signal Sch is generated such that the head byte of the video frame of the sub picture data corresponding to this highlight end is outputted from the sub picture decoder 90 at the highlight end time described in this referred data.

In the above explained examples, the information 201 is referred to after the whole of the information 201 is read in the highlight buffer 96. However, it is also possible to perform this referring process earlier than that, so that only the portion of the highlight information to be updated is outputted to the highlight buffer 96. Further, in the above explanation, the "previous VOBU" is defined as the VOBU which is outputted from the demultiplexer one VOBU previous to the pertinent VOBU outputted therefrom. In this case, the content of the "highlight start point" and the content of the "highlight end point" are the same as those of the previous VOBU, while the new button command is made effective from the start point of the new VOBU.

As described above in detail, according to the reproducing apparatus S2 of the present embodiment, by referring to the information indicative of the start point and the end point of the highlight which is described in the highlight general information HL-GI included in the PCI packet within each navi-pack as the occasion demands, it is possible to specify the start of the highlight display or the reception of the button command to execute, at the time corresponding to a desired GOP or video frame within each navi-pack. Further, it is possible to specify the end of the highlight display or the reception of the button command to execute at the time corresponding to a desired GOP or video frame. As a result, it is possible for the reproducing apparatus S2 to perform the highlight display of the sub picture precisely as for the time, on the GUI picture plane formed by superimposing the sub picture on the main picture for example, on the basis of these informations indicating the start point and the end point.

As described above, the present embodiment is suitable for such an application that the highlight information is made effective only within a specific time duration during the reproduction e.g. such an application that the relationship between the timing of the highlight and the timing of the operation by the audience is an important game factor, such as a quick answering quiz, a mole beating game and the like. Hereinbelow, these concrete examples are explained.

Firstly, the example of the quick answering quiz is explained. For example, it is assumed that a plurality of numerals are dispersed on a picture plane, and that only either one of these numerals is lightened (highlighted) for a very short time period by use of the highlight information including the highlight effective time period. With respect to this, the audience inputs the key for the numeral which is highlighted. However, the time period or duration during which this input is received by the reproducing apparatus S2 is only the highlight effective time period, such that, only when the input of the key same as the highlighted key is received during this period, the point is added into the score of the register by the button command. At this time, if the different key is inputted or the input of the key input is late, the button command is not executed, and thereby the score is not changed. In the game of competing as for the score in this manner, the present embodiment is effective. Incidentally, in this example, the background picture plane is displayed by the main picture, while the numeral is superimposed thereon by the sub picture and the numeral is lightened by the highlight information.

Next, the example of mole beating game is explained. In this example, a plurality of moles who are coming out of holes here and there are displayed by the main picture, while a transparent sub picture is superimposed at every position where the mole comes out. And that, the highlight information, which is made effective only during the very short time period or duration during which the mole comes out of the hole, is described in the PCI packet of the corresponding VOBU. The highlight information is prescribed such that, only when the key input is executed with respect to a position where the mole comes out during this effective time period, this position is highlighted, and the corresponding button command is executed. The point is added to the score in the same manner as in the previous example. Incidentally, if it is not necessary to change the display on the picture plane at the time of the corresponding key input, only the command may be apparently executed by performing a transparent highlight at the time of executing the command. As in this example, since it is possible to only perform the command without performing the highlight at the time of button selection or confirmation, the information as for the highlight start point and end point may be defined with respect to only the button command.

Figure 11:
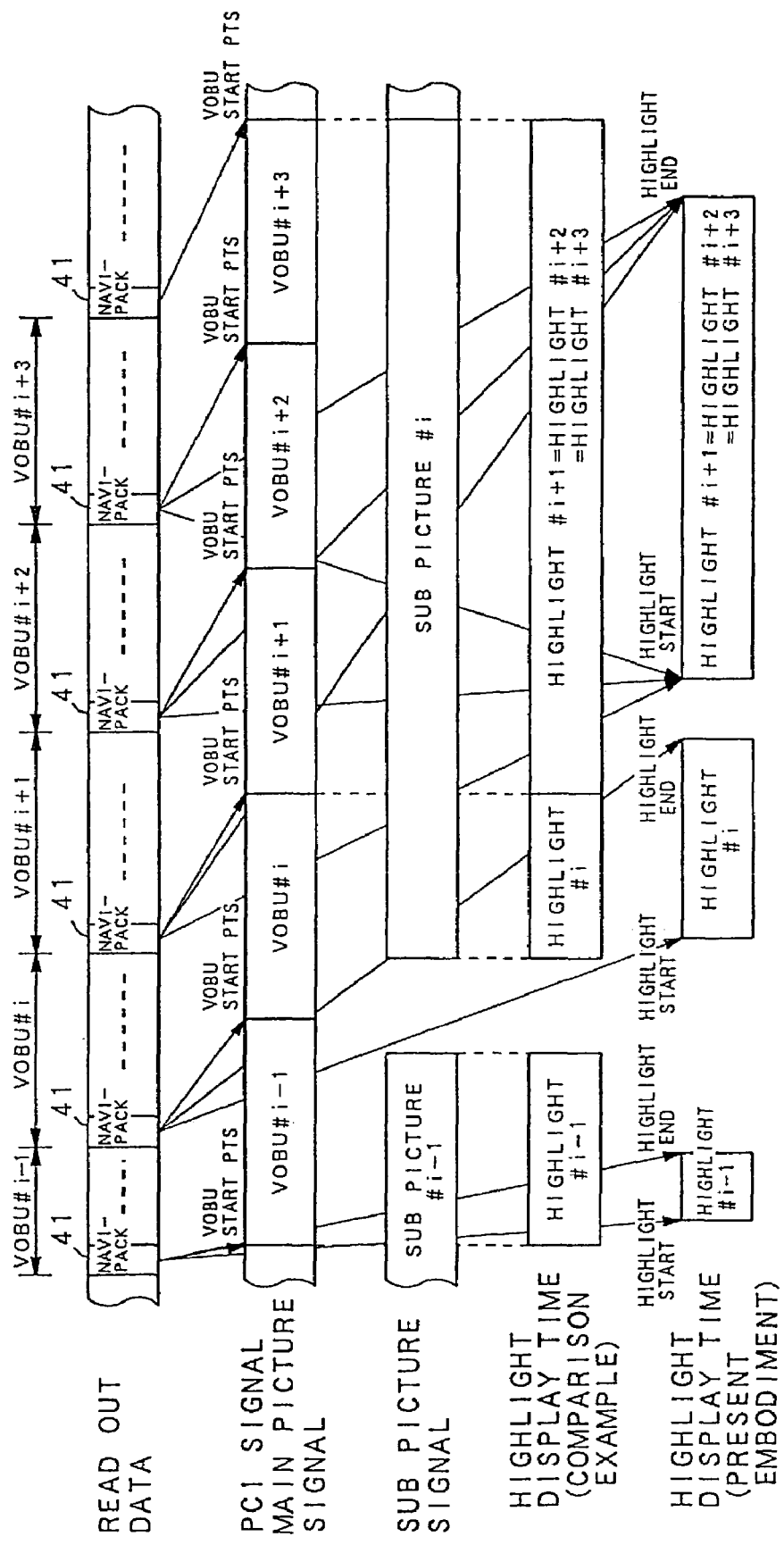
FIG. 11 is a timing chart indicating a highlight displaying operation of the information reproducing apparatus of FIG. 10 and a displaying operation of a comparison example as comparing these operation.

Here, the aspect of the above mentioned time management of the highlight display and the operation control of the sub picture is explained as for each case of the present embodiment and the comparison example with reference to a timing chart of FIG. 11.

In FIG. 11, the PCI signal included in each navi-pack in the read out data is decoded at the time indicated by the VOBU start PTS (Presentation Time Stamp) included in the PCI signal itself and is made effective. Then, if the main picture signal exists in the VOBU, it becomes the VOBU start PTS of the display start of the main picture signal. The start and end of the display can be set for the sub picture signal independently from the main picture, by the command related to the display included in the sub picture signal itself.

As a comparison example in contrast to the present embodiment, such an example is assumed that the highlight start or end information does not exist in the highlight information. In this case, it is inevitable to start the highlight at the display start of the sub picture corresponding to the VOBU start PTS of the PCI signal including the highlight information, and that the display end must be matched with the output end of the VOBU of the PCI signal including the same highlight information or the display end of the corresponding sub picture signal. Further, in this comparison example, the time period or duration during which the sub picture is highlight-displayed is slightly changed or fluctuated depending upon the process time of each buffer, each decoder etc., and also the data amount included in each sub picture pack 44 and each navi-pack 44. Namely, if the specification of the information reproducing apparatus is different, the highlight display of the sub picture to be highlight-displayed is delayed or accelerated by an amount corresponding to the error between the respective reproducing apparatuses. Furthermore, since the highlight display is prescribed for the unit of the VOBU 30 for each navi-pack 41, it is impossible to prescribe the start or end of the highlight display by the unit of the GOP or the video frame, for example.

On the contrary to this, according to the present embodiment, since the start and end of the highlight can be arbitrarily set by the time indicated at the unit of 90 kHz independently from the display start or end of the main picture or sub picture, it is possible to perform the highlight display, to which the precise correlation is given with the highlight display in a very short time period and the time change of the content of the main picture.

As aforementioned, if the display of the highlight information is started during the display time period of the corresponding VOBU, which is different from each highlight information, the highlight start and end in formation of the highlight information is described in the pertinent highlight information. If the highlight information is effective and if the highlight information is the same as the previous highlight information completely or partially other than the button command, the highlight start and end information of the highlight information which has been displayed form the previous VOBU is described in the pertinent highlight information. The arrows of the highlight start and end in FIG. 11 indicate the above mentioned relationships.

As described above, according to the present embodiment, it is very convenient that the effective time period of the highlight information can be set by the frame unit independently form the start position of the VOBU or the start position of the sub picture.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An information reproducing apparatus for reproducing an information record medium, the information record medium comprising image information, and highlight information for highlighting the image information, including time management information for highlight display, the information reproducing apparatus comprising:
a reader that reads the image information and the highlight information from the information record medium;
a first decoder that decodes the image information;
a second decoder that decodes the highlight information; and
a controller that controls the highlight display of the image information in accordance with the highlight information and the time management information.

2. The apparatus according to claim 1, wherein the time management information defines a time period during which the highlight display is to be effective,
wherein the controller controls the highlight display such that the highlight display is performed during the time period.

3. The apparatus according to claim 2, wherein the time management information includes a start time information indicating a start time of highlight display and end time information indicating an end time of the highlight display,
wherein the controller controls the highlight display such that the highlight display is started at a timing corresponding to the start time information and the highlight display is terminated at a timing corresponding to the end time information.

4. The apparatus according to claim 2, wherein the controller controls the highlight display independently from a display of the image information.

5. The apparatus according to claim 3, wherein the start time of highlight display is at the same time as or later than a start time of displaying the image information to be highlighted and the end time of the highlight display is at the same time as or earlier than an end time of displaying the image information to be highlighted.

6. The apparatus according to claim 1, wherein the highlight information is contained in a presentation control information unit and further includes highlight status information indicating status of highlight information in the presentation control information unit, and
wherein the controller controls the highlight display in accordance with the status information.

7. The apparatus according to claim 6, wherein the status includes at least one of 1) there is no valid highlight information in the presentation control information unit, 2) the highlight information is different from highlight information in a previous presentation control information unit, 3) the highlight information is the same as highlight information in a previous presentation control information unit, and 4) the highlight information is partly the same as highlight information in a previous presentation control information unit.

8. The apparatus according to claim 1, wherein the image information is sub picture information,
wherein the record medium further includes video information,
wherein the apparatus further includes a third decoder which decodes the video information, and
a mixer which mixes the video information and the sub picture information.

9. An information recording apparatus, comprising:
a processing unit which generates image information and highlight information for highlighting the image information, which includes time management information for highlight display; and
a recording unit which records the image information and the highlight information onto a recording medium.

10. The apparatus according to claim 9, wherein the time management information defines a time period during which the highlight display is to be effective.

11. The apparatus according to claim 10, wherein the time management information includes a start time information indicating a start time of highlight display and end time information indicating an end time of the highlight display.

12. The apparatus according to claim 10, wherein the time management information enables the highlight display independently from a display of the image information.

13. The apparatus according to claim 11, wherein the start time of highlight display is at the same time as or later than a start time of displaying the image information to be highlighted and the end time of the highlight display is at the same time as or earlier than an end time of displaying the image information to be highlighted.

14. The apparatus according to claim 9, wherein the highlight information is contained in a presentation control information unit and further includes highlight status information indicating status of highlight information in the presentation control information unit.

15. The apparatus according to claim 14, wherein the status includes at least one of 1) there is no valid highlight information in the presentation control information unit, 2) the highlight information is different from highlight information in a previous presentation control information unit, 3) the highlight information is the same as highlight information in a previous presentation control information unit, and 4) the highlight information is partly the same as highlight information in a previous presentation control information unit.

16. The apparatus according to claim 9, wherein the highlight information further includes a plurality of button information each of which indicates a selection branch or an option displayed by the image information.

17. The apparatus according to claim 9, wherein the image information is sub picture information, and
wherein the processing unit further generates video information.

18. An information reproducing method for reproducing an information record medium, the information record medium comprising image information, and highlight information for highlighting the image information, including time management information for highlight display,
the information reproducing method comprising the steps of:
reading the image information and the highlight information from the information record medium;
decoding the image information;
decoding the highlight information; and
controlling the highlight display of the image information in accordance with the highlight information and the time management information.

19. The method according to claim 18, wherein the time management information defines a time period during which the highlight display is to be effective,
wherein the step of controlling controls the highlight display such that the highlight display is performed during the time period.

20. The method according to claim 19, wherein the time management information includes a start time information indicating a start time of highlight display and end time information indicating an end time of the highlight display,
wherein the step of controlling controls the highlight display such that the highlight display is started at a timing corresponding to the start time information and the highlight display is terminated at a timing corresponding to the end time information.

21. The method according to claim 19, wherein the step of controlling controls the highlight display independently from a display of the image information.

22. The method according to claim 20, wherein the start time of highlight display is at the same time as or later than a start time of displaying the image information to be highlighted and the end time of the highlight display is at the same time as or earlier than an end time of displaying the image information to be highlighted.

23. The method according to claim 18, wherein the highlight information is contained in a presentation control information unit and further includes highlight status information indicating status of highlight information in the presentation control information unit, and
wherein the step of controlling controls the highlight display in accordance with the status information.

24. The method according to claim 23, wherein the status includes at least one of 1) there is no valid highlight information in the presentation control information unit, 2) the highlight information is different from highlight information in a previous presentation control information unit, 3) the highlight information is the same as highlight information in a previous presentation control information unit, and 4) the highlight information is partly the same as highlight information in a previous presentation control information unit.

25. The method according to claim 18, wherein the image information is sub picture information, wherein the recording medium further includes video information, and wherein the method further includes the steps of:
decoding the video information, and
mixing the video information and the sub picture information.

26. An information recording method, comprising the steps of:
generating image information and highlight information for highlighting the image information, which includes time management information for highlight display; and
recording the image information and the highlight information onto a recording medium.

27. The method according to claim 26, wherein the time management information defines a time period during which the highlight display is to be effective.

28. The method according to claim 27, wherein the time management information includes a start time information indicating a start time of highlight display and end time information indicating an end time of the highlight display.

29. The method according to claim 27, wherein the time management information enables the highlight display independently from a display of the image information.

30. The method according to claim 28, wherein the start time of highlight display is at the same time as or later than a start time of displaying the image information to be highlighted and the end time of the highlight display is at the same time as or earlier than an end time of displaying the image information to be highlighted.

31. The method according to claim 26, wherein the highlight information is contained in a presentation control information unit and further includes highlight status information indicating status of highlight information in the presentation control information unit.

32. The method according to claim 31, wherein the status includes at least one of 1) there is no valid highlight information in the presentation control information unit, 2)

the highlight information is different from highlight information in a previous presentation control information unit, 3) the highlight information is the same as highlight information in a previous presentation control information unit, and 4) the highlight information is partly the same as highlight information in a previous presentation control information unit.

33. The method according to claim 26, wherein the highlight information further includes a plurality of button information each of which indicates a selection branch or an option displayed by the image information.

34. The method according to claim 26, wherein the image information is sub picture information, and wherein the step of generating further generates video information.

\* \* \* \* \*